United States Patent
Singh et al.

(10) Patent No.: US 7,860,007 B2
(45) Date of Patent: Dec. 28, 2010

(54) METHOD AND COMMUNICATION SYSTEM FOR OPTIMIZING THE THROUGHPUT OF A TCP FLOW IN A WIRELESS NETWORK

(75) Inventors: Jatinder Pal Singh, Berlin (DE); Gerhard Kadel, Darmstadt (DE); Gerd Zimmermann, Weiterstadt (DE); Bangnan Xu, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 985 days.

(21) Appl. No.: 11/494,822

(22) Filed: Jul. 28, 2006

(65) Prior Publication Data

US 2008/0025216 A1   Jan. 31, 2008

(51) Int. Cl.
H04L 12/26 (2006.01)
(52) U.S. Cl. .................................................... 370/235
(58) Field of Classification Search ................. 709/223; 370/229, 230, 231
See application file for complete search history.

(56) References Cited

U.S. PATENT DOCUMENTS

| | | | |
|---|---|---|---|
| 2003/0063564 A1* | 4/2003 | Ha et al. | 370/230 |
| 2004/0215753 A1* | 10/2004 | Chan et al. | 709/223 |
| 2005/0135412 A1* | 6/2005 | Fan | 370/463 |
| 2005/0254420 A1* | 11/2005 | Wager et al. | 370/230 |
| 2006/0045117 A1* | 3/2006 | Qi et al. | 370/445 |
| 2006/0104201 A1* | 5/2006 | Sundberg et al. | 370/230 |
| 2006/0146695 A1* | 7/2006 | Maheshwari et al. | 370/216 |
| 2006/0198300 A1* | 9/2006 | Li et al. | 370/229 |
| 2006/0206579 A1* | 9/2006 | Connor et al. | 709/214 |

FOREIGN PATENT DOCUMENTS

EP   1 638 270   3/2006

OTHER PUBLICATIONS

Balakrishnan et al., "A Comparison of Mechanisms for Improving TCP Performance over Wireless Links," IEEE/ACM Transactions on Networking, vol. 5, No. 6, Dec. 1997, p. 756-769.
Gupta et. al., "Reliable ELN to enhance throughput of TCP over wireless links via TCP header checksum," IEEE Global Telecommunications Conference, vol. 2, p. 1985-1989, 2002.
Bakre et. al., "Handoff and System Support for Indirect TCP/IP," 2nd USENIX Symposium on Mobile and Location-dependent Computing, 1995 (14 pages).
Brown et. al., "M-TCP: TCP for Mobile Cellular Networks," ACM SIGCOMM Computer Communications Review, 1997 (25 pages).

(Continued)

*Primary Examiner*—Anh-Vu Ly
(74) *Attorney, Agent, or Firm*—Davidson, Davidson & Kappel, LLC

(57) ABSTRACT

A method and a system is provided for optimizing the throughput of a TCP flow from a TCP source to a TCP destination in a wireless network with the path of the flow encompassing a wireless link between a wireless transmitter and a wireless receiver. The throughput is optimized by using link-layer mechanisms at the wireless transmitter which are adaptive to the instantaneous TCP dynamics of the TCP flow. In particular, a cross-layer approach is disclosed which serves to tunnel information of TCP congestion control dynamics directly from the TCP based transport layer to the data link-layer which selects in response to these information modulation and/or coding schemas to transmit TCP segments via data link-layer blocks with improved TCP throughput.

16 Claims, 24 Drawing Sheets

OTHER PUBLICATIONS

Miyoshi et al., "Performance Evaluation of TCP Throughput on Wireless Cellular Networks," IEEE Vehicular Technology Conference, 2001, pp. 2177-2181.

Chan et. al., "TCP/IP Performance over 3G Wireless Links with Rate and Delay Variation," MobiCom '02, Sep. 23-28, Atlanta, Georgia, USA, (12 pages).

Balakrishnan et al., "Improving TCP/IP Performance over Wireless Links," in Proc. 1st ACM Mobile Computing and Networling (Mobicom, Nov. 1995, (10 pages).

Laura Gallucio et al., "An Analytical Study of a Tradeoff between Transmission Power and FEC for TCP Optimization in Wireless Networks," IEEE INFOCOM 2003 (9 pages).

Barman et al., TCP Optimization through FEC, ARQ, and Transmission Power Tradeoffs, International Conference on Wired/Wireless Internet Communications, 2004, (12 pages).

Singh et. al., "Channel State Awareness based Transmission Power Adaptation for Efficient TCP Dynamics in Wireless Networks," IEEE International Conference in Communications, 2005, pp. 3553-3559.

Stevens, "TCP Slow Start, Congestion Avoidance, Fast Retransmit, and Fast Recovery Algorithms," Request for Comments 2001, Category Standards Track, Jan. 1997 (6 pages).

Altman et. al., "A Stochastic Model of TCP/IP With Stationary Random Losses," IEEE/ACM Transactions on Networking, vol. 13, No. 2, Apr. 2005, p. 356-369.

Padhye et. al., "Modelling TCP Throughput: A Simple Model and its Empirical Validation," ACM SIGCOMM, 1998 (12 pages).

Allman et. al., "TCP Congestion Control," Request for Comments 2581, Obsoletes: 2001, category: Standards Track, Apr. 1999 (14 pages).

Molkdar et. al., "An Overview of EGPRS: the packet data component of EDGE," Electronics and Communication Engineering Journal, Feb. 2002, p. 21-38.

Krishnaswamy, "Network-assisted link-adaptation with power control and channel re-assignment in wireless networks," 3G Wireless Conference, 2002 (6 pages).

Furuskar et. al., "System Performance of the EDGE Concept for Enhanced Data Rates in GSM and TDMA/136," IEEE Wireless Communications and Networking Conference 1999, p. 752-756.

Paxson et. al.,"Computing TCP's Retransmission Timer," Network Working Group, Request for Comments: 2988, Category Standards Track, Nov. 2000 (7 pages).

* cited by examiner

METHOD AND COMMUNICATION SYSTEM FOR OPTIMIZING THE THROUGHPUT OF A TCP FLOW IN A WIRELESS NETWORK

The present invention is directed towards a method and a communication system which uses TCP dynamics aware link adaptation measures to optimize the throughput of a TCP flow in a wireless network that offers link-layer adaptation measures like adaptive modulation, adaptive coding, or a combination thereof. In particular, a method and a communication system is provided for exercising link-layer adaptation to optimize the throughput of a TCP flow in a wireless network by modelling the congestion control dynamics of TCP using a dynamic programming based optimization framework. In one embodiment, a link adaptation scheme for EGPRS networks is demonstrated to result in significant enhancement in TCP throughput.

BACKGROUND

With the proliferation in use of wireless devices over past several years, there has been a growing interest for access to mobile Internet and web-based applications. TCP, being a popular transport layer protocol for the Internet, is primarily responsible for transfer of Internet data in heterogeneous networks comprised of wired and wireless links. However, it was originally designed to operate well in wire-line environments where the channel conditions are highly reliable and data losses are primarily due to congestion. It thus faces operational challenges in wireless scenarios that are characterized by sporadic losses and disconnections. TCP perceives the losses on a wireless link to be an indication of network congestion and invokes its congestion control mechanisms. This leads to a reduction in data transfer rate and impairment of the end-to-end throughput. The solutions that have been proposed over the past several years to counter the problem include end-to-end schemes, split connection approaches, and TCP aware link layer protocols. The end-to-end schemes as suggested, for example, in Balakrishnan et al., "A Comparison of Mechanisms for Improving TCP Performance over Wireless Links," IEEE/ACM Transactions on Networking, 1998, and Gupta et. al., "Reliable ELN to enhance throughput of TCP over wireless links via TCP header checksum," IEEE Global Telecommunications Conference, vol. 2, p. 1985-1989, 2002, involve making changes to TCP to make it capable of distinguishing between congestion and wireless link losses. The Explicit Loss Notification (ELN) is one such end-to-end mechanism. The ELN option is added to TCP acknowledgements. When a segment is dropped on a wireless link, the acknowledgements for the subsequent segments are marked to identify that a non-congestion loss has occurred. On receiving such an acknowledgement, the TCP source can perform retransmission of the lost segment without invoking congestion control mechanisms. Although end-to-end schemes preserve TCP semantics, these require modifications to TCP. The infeasibility of Internet wide deployment of such changes poses a severe restriction to the practical utility of such solutions. The split-connection approaches, as suggested, for example, in Bakre et. al., "Handoff and System Support for Indirect TCP/IP," $2^{nd}$ USENIX Symposium on Mobile and Location-dependent Computing, p. 11-24, 1995, and Brown et. al., "M-TCP: TCP for Mobile Cellular Networks," ACM SIGCOMM Computer Communications Review, 1997, divide the TCP connection between the source and destination into two distinct connections—one between the source and the base station (BS) and the other between the BS and the destination. A specialized protocol tuned to the wireless environment can be used for the connection that extends over the wireless hop. The split-connection approach is, however, marred by increased processing overheads, violation of end-to-end semantics of TCP acknowledgements, and slow, complicated handoffs. Enhanced link layer reliability as suggested, for example, in Miyoshi et al., "Performance Evaluation of TCP Throughput on Wireless Cellular Networks," IEEE Vehicular Technology Conference, 2001, has been investigated as a mechanism to improve TCP performance in wireless scenarios. However, link layer designs that are TCP unaware cannot efficiently shield TCP from the wireless losses, and are also associated with increased rate and delay variability as described in Chan et. al., "TCP/IP Performance over 3G Wireless Links with Rate and Delay Variation," ACM MobiCom, p. 71-82, 2002. On the other hand, approaches on line of the SNOOP protocol suggested in Balakrishnan et al., "Improving TCP/IP Performance over Wireless Links," ACM MobiCom, 1995, represent a TCP aware link layer design. While SNOOP preserves the end-to-end semantics of TCP and does not require any changes to TCP implementation, it has its own share of limitations. It cannot be used for the case when TCP data and ACKs do not both traverse through the base station BS or an access point (AP). The protocol also has overhead associated with SNOOP cache maintenance. Moreover, during the interim period between the handoffs, the Base Station (BS) or Access Point (AP) to which the handoff is occurring cannot snoop on any acknowledgements sent from the mobile host. Another disadvantage of the SNOOP protocol is its inability to function when TCP headers are encrypted.

None of the aforementioned solutions encompass or utilize adaptivity of wireless systems features like FEC, modulation transmission power, and multiple transmission modes like modulation and coding schemas. There have been some recent efforts including, for example, Laura et al., "An Analytical Study of a Trade-off between Transmission Power and FEC for TCP Optimization in Wireless Networks," IEEE INFOCOM 2003 and Barman et al., TCP Optimization through FEC, ARQ, and Transmission Power Trade-offs, "International Conference on Wired/Wireless Internet Communications, 2004, to examine adaptive link layer measures for TCP throughput optimization. The authors adopt standard steady state TCP throughput expressions and perform optimization by adapting the coding rate, number of retransmission attempts and transmission power. The TCP dynamics and congestion control mechanisms are not considered in the work. However, for performance optimization, the link layer needs to be adaptive to the instantaneous dynamics of a TCP flow. In Singh et. al., "Channel State Awareness based Transmission Power Adaptation for Efficient TCP Dynamics in Wireless Networks," IEEE International Conference in Communications, 2005, power control measures based on TCP's congestion avoidance dynamics have been proposed for throughput enhancement in a simplified scenario. The work does not address realistic wireless network conditions, and link adaptation based on adaptive modulation and coding is not accounted for. Furthermore the work does not have any comprehensive characterization of the congestion control dynamics of TCP.

In European Patent No. 05015951.6-, a method and system is proposed to model TCP throughput and to evaluate power control measures to compensate for fading and path loss for highly mobile systems. The work does not model the dynamics of TCP and uses a steady state TCP throughput expression to evaluate power adaptation policies to enhance TCP throughput. Link adaptation measures like adaptive modulation and coding are not explored in the work.

SUMMARY OF THE INVENTION

The popularity of TCP (transport control protocol) as a data transfer protocol for the Internet mandates its deployment in wireless networks owing to a pressing demand for mobile web based applications. However, the invocation of congestion control mechanisms of TCP in response to wireless channel losses causes impairment of the data transfer rate.

An object of the present invention is to contemplate a cross-layer interaction methodology between a transport layer protocol using TCP dynamics (e.g. congestion control mechanisms) and an adaptive data link layer protocol to optimize the data transfer rate of TCP segments, i.e. the TCP throughput, in wireless networks.

In particular, a method and a system is provided to optimize the throughput of a TCP flow from a TCP source to a TCP destination over a transmission path, with the transmission path encompassing a wireless link between a wireless transmitter and a wireless receiver, by using link-layer mechanisms implemented at the wireless transmitter, which are adaptive to the instantaneous dynamics of the TCP flow. The TCP flow dynamics can be described via congestion window size evolution at the TCP source. In particular, the slow start and congestion avoidance algorithms are used as congestion control mechanisms which determine the evolution or variation of the congestion window size. The variation of the congestion window size as controlled by the TCP source follows specific patterns which are referred to as congestion window size variation patterns, herein also referred to as cycles. These algorithms are used by the source to control the amount of unacknowledged data being injected into the wireless network. Furthermore, the congestion events Timeout (TO) and Triple Duplicate (TD) loss indications are considered to control the cycles.

To optimize the TCP throughput, different congestion window size variation patterns are modelled and the window size for each round of a specific cycle is evaluated. The evaluated window sizes are used by a throughput optimization framework. The progression of each TCP cycle of the TCP source is characterised in terms of rounds, with each round having a specific window size which defines the number of TCP segments to be transmitted. The essence of the optimization lies in the selective protection of TCP segments depending on their transmission round in a current cycle. The loss of a TCP segment early in a cycle is detrimental to TCP throughput, and hence should be prevented via transmission protection over the wireless link. The transmission protection can be rendered through a high segment success probability, which can be attained via adaptive link layer measures, e. g. by selecting different modulation and coding schemas, greater transmission power, etc.

There is a method provided which optimizes the throughput of a flow of TCP segments being transferred from a TCP source to a TCP destination over a transmission path, with the path of the flow encompassing a wireless link between a wireless transmitter and a wireless receiver, the said method comprising the steps of:

a) providing for a plurality of congestion window size variation patterns based on TCP congestion control algorithms used by the TCP source, each pattern comprising a number of rounds;

b) determining a plurality of wireless channel conditions;

c) defining a plurality of initial window sizes;

d) calculating, with respect to each of the wireless channel conditions and each of the initial window sizes, for each round of each congestion window size variation pattern a target success probability for each TCP segment to be transmitted during the respective round;

e) selecting a calculated target success probability for a TCP segment to be transmitted by the transmitter by determining the current congestion window size variation pattern, the current round number and the current initial window size for the current variation pattern;

f) selecting in response to the selected target success probability at least one adaptive data link-layer transmission mode for transmitting the TCP segment in at least one link-layer block to the receiver to achieve an optimized TCP throughput; and g) repeating steps e) and f) for the next TCP segment to be transmitted.

An exemplary method specifies a generic methodology to exercise link adaptation measures for optimizing the throughput of a TCP flow in a wireless network. In particular, adaptive modulation, adaptive coding, adaptive power control, or a combination thereof, may be used to optimize the TCP throughput.

In a preferred embodiment the slow start and the congestion avoidance algorithm are used as the TCP congestion control algorithms, wherein in step c) at least one slow start threshold value is defined, which is used in steps d) and e) when the congestion window size variation pattern begins in the slow start phase.

In a preferred embodiment, a dynamic programming based framework for optimizing the TCP throughput is used. In particular, step d) of calculating the target TCP segment success probabilities is based on finite-period dynamic programming methods, wherein the calculated target TCP segment success probabilities are obtained by minimizing the cost-to-go.

In another preferred embodiment, the TCP source and the wireless transmitter is a mobile device and the wireless receiver is a base station or an access point, wherein the wireless receiver can be a host connected to the Internet.

In yet another preferred embodiment the TCP destination is a mobile device and the wireless transmitter is a base station or an access point.

An exemplary method suggests the modulation, coding and transmission power levels to be employed for data transmission by a wireless device to optimize the uplink throughput of a TCP connection between the device and an Internet host. Consequently, an embodiment of the present invention may be used for improving the uplink speed for Internet based applications, web browsing, file transfers and alike, in mobile devices. Such an embodiment may include, for example, tunnelling of TCP dynamics information concerning information of the congestion window size variation patterns used by the transport layer down to the link layer of the user's end device, parsing of this information by the link-layer, solution of the optimization framework, i. e. calculating the target success probabilities based on observed channel conditions or reference of predetermined heuristics obtained by offline solutions of the optimization framework, and determination of the modulation and coding scheme for the blocks or frames to be transmitted by the link layer.

Yet another exemplary method of the present invention suggests the modulation and coding schemes to be used at a base station or an access point to optimize the downlink throughput of TCP connection between an Internet host and a mobile device. Consequently, an embodiment of the present invention may be used for improving the download speed for Internet applications in mobile devices. Such an embodiment may include transfer by the Internet host of TCP dynamics information to the link-layer of a base station or access point, reference at the base station or access point to online or heuristics based solution for determination of modulation and coding schemes for the data to be transmitted by the link layer, and exercising of TCP dynamics aware link adaptation by the base station or access point for optimization of TCP throughput.

Still another exemplary method of the present invention may be used by network operators providing data services via the cellular wireless access technologies like, for example, EGPRS and UMTS. The web download speed for clients subscribed to a wireless Internet Service Provider can be sufficiently improved by exercising TCP dynamics aware link adaptation measures at the base stations. Similarly the uplink speed of Internet can be improved via suitable link adaptation at user devices. In another embodiment, the present invention may also be used for enhancing TCP performance in wireless local area networks based on IEEE 802.11 technologies thereby improving, for example, the user wireless access experience in hotspots like train stations, restraints, cafes. The IEEE 802.11 compliant access points and user devices would in this case exercise TCP dynamics aware link adaptation methods suggested in this invention.

Therefore the source can be a mobile device and the destination can be an Internet host or vice versa.

In a preferred embodiment, step b) of determining a plurality of wireless channel conditions comprises the step of evaluating wireless channel conditions on the basis of different channel models, and wherein the target success probabilities, the type of the congestion window size variation patterns, the round number of each congestion window size variation pattern, the initial window sizes and the slow start threshold values are stored for example in look-up tables.

In a preferred embodiment, step f) of selecting at least one adaptive data link-layer transmission mode is a function of the link-layer block error rate characteristics.

An exemplary method of the present invention specifies a TCP dynamics aware Early Round Protection (ERP) scheme for link-adaptation in EGPRS networks. The ERP policy is derived from the TCP throughput optimization framework. An embodiment of the present invention may thus be used for enhancing the throughput of TCP in an EGPRS network.

This is achieved by determining in step f), whether the current window size is less than a predetermined window size value. If it is not the TCP segment is transmitted via at least one link-layer block by using the link quality control procedure of EGPRS. In particular, the link quality control procedure comprises link adaptation (LA) and the incremental redundancy (IR). With the link quality control low error rate modulation schemes and/or high coding rate schemas can be performed to protect the early rounds.

The above mentioned problems are also solved by a communications system for optimizing the throughput of a TCP flow in a wireless network, which comprises a wireless network with base stations or access points, a plurality of end devices connected to the wireless network, wherein each end device at least has a transport layer supporting TCP. Each device and each base station or access point further includes:

a storage for storing a plurality of target TCP segment success probabilities, the type of TCP congestion window size variation patterns, the round number of each congestion window size variation pattern, at least one initial window size;

means for determining the current congestion window size variation pattern, the current round number and the current initial window size used by the respective end device to transmit a TCP segment;

a processor for selecting a stored target success probability for a TCP segment to be transmitted in response to the current congestion window size variation pattern, the current round number and the current initial window size determined, and for selecting in response to the selected target success probability at least one adaptive data link-layer transmission mode; and means for transmitting the TCP segment in at least one link-layer block by using the selected adaptive link-layer transmission mode.

Furthermore, a storage medium is provided which stores a set of instructions, the set of instructions being executable by a processor to perform a method for optimizing the throughput of a flow of TCP segments being transferred from a TCP source to a TCP destination over a transmission path, with the transmitting path of the flow encompassing a wireless link between a wireless transmitter and a wireless receiver.

BRIEF DESCRIPTION OF THE DRAWINGS

The invention, together with its objects and the advantages thereof, may be best understood by reference to the following description taken in conjunction with the accompanying drawings, in which like reference numerals identify like elements in the Figures and in which.

DETAILED DESCRIPTION

Figure 1:
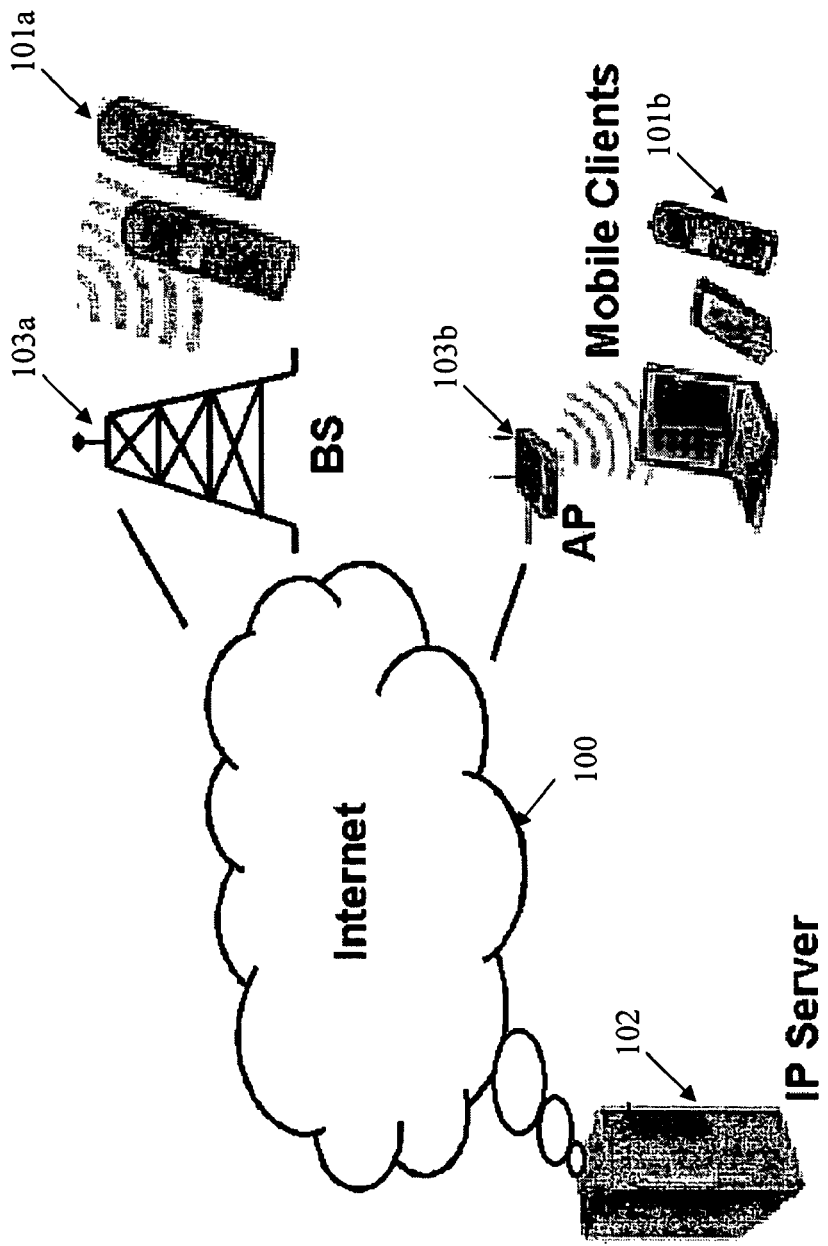
FIG. 1 shows a scenario with uplink and downlink TCP connections between mobile hosts and the Internet.

FIG. 1 shows an exemplary communications system which is adapted to transmit bulk transfer TCP traffic between mobile devices 101a, 101b, and a host 102 which is connected to a wired network, for example the Internet 100. The mobile devices 101a are connected via a base station 103a to the Internet 100 wherein the mobile devices 101b are connected via an access point 103b to the Internet 100. The mobile devices, the base station and the access point are parts of a wireless network like UMTS, GPRS or EGRPRS. At least a TCP based transport layer, a networking layer, a link layer and a physical layer exist in the mobile devices 101a and 101b and the host 102. Furthermore, at least a link layer exists in the base station 103a as well as the access point 103b. Link layer adaptation is performed in a mobile device on the uplink wireless channel when the mobile device, e. g. 101a constitutes the TCP source and on the base station 103a or the access point 103b when the mobile device 101a and 101b, respectively, is the TCP destination. The present invention delineates a cross-layer approach that optimizes TCP throughput between the mobile device 101a and the base station 103 or between mobile device 101b and the access point 103b by performing the link-layer adaptation on the wireless link in accordance with TCP dynamics. The cross-layer approach serves to tunnel information of TCP congestion control dynamics directly from the TCP based transport layer to the data link-layer which selects in response to these information modulation and/or coding schemas to transmit TCP segments via data link-layer blocks with improved TCP throughput.

The TCP flow whose throughput is targeted to be optimized, traverses through wired infrastructure and the wireless hop. TCP segments are transmitted by the TCP source, e. g. mobile device 101a over the wireless channel with suitable lower-layer header encapsulations to the base station 103a. A TCP segment may be transmitted via a variable number of link layer and physical layer frames/blocks. Error detection and error correction mechanism (FEC, ARQ, etc.), play a role in ascertaining the successful delivery of a TCP segment. In addition, measures like Link Adaptation (LA) and Incremental Redundancy (IR), could be employed in wireless networks like EDGE and WLANs (e.g. IEEE 802.11a).

The congestion control dynamics of a bulk transfer TCP flow can be generally described via the TCP window size evolution and congestion events. A TCP bulk-transfer originates from a TCP source, e. g. mobile station 101a with a large amount of data to send. The congestion window designates the limit on maximum amount of data or the number of TCP segments that can be transmitted without waiting for an acknowledgement (ACK). The TCP destination, for example the host 102 advertises a similar limit on outstanding data based on its buffer limitations. At any time, a TCP source can send as many unacknowledged segments as allowed by the minimum of congestion and TCP destination advertized windows. The slow start and congestion avoidance algorithms, as presented in Stevens, "TCP Slow Start, Congestion Avoidance, Fast Retransmit, and Fast Recovery Algorithms," RFC 2001, 1997, determine the evolution of the congestion window and are used by the source to control the amount of unacknowledged data being injected into the wireless 100 network. During the slow start phase, TCP increments the congestion window by one segment for each ACK that acknowledges new data. This entails doubling of the window every Round Trip Time (RTT). The congestion avoidance phase on the other hand is marked by an increment of one in window size every RTT. The slow start phase governs the dynamics until the window size reaches a threshold called the slow start threshold beyond which congestion avoidance takes over. The idea is to make TCP probe for network capacity by increasing the window size first aggressively and then cautiously. In case of a timeout (TO) or triple duplicate (TD) loss indication, the value of the threshold is set to the minimum of two segments and half of the current congestion window size. At all times TCP's window size is limited by the destination advertised window.

The TO and TD loss indications as explained in Altman et. al., "A Stochastic Model of TCP/IP with Stationary Random Losses," IEEE/ACM Transactions on Networking, 2005, and Padhye et. al., "Modelling TCP Throughput: A Simple Model and its Empirical Validation," ACM SIGCOMM, p. 303-314, 1998, characterize the congestion or loss events of TCP. The TO indication occurs when the TCP source, e. g. mobile device 101a is waiting for an ACK from the host 102 and the retransmission timer expires. TCP infers that the TCP segment has been lost: it reduces the window size to one segment, retransmits the segment, and doubles the retransmission time out (RTO) value. This retransmission procedure is repeated until the packet is ACKed and subsequently TCP window dynamics follow the slow start or congestion avoidance algorithms, depending on the values of threshold and congestion window size. The TD loss indication on the other hand is characterized by the arrival at the source, e.g. 101a, of three duplicate ACKs. A duplicate ACK is generated by the destination 102 in response to arrival of an out-of-order segment and bears the sequence number of the next expected in-order segment. TCP's Fast Retransmit algorithm uses the arrival of 3 duplicated ACKs (4 ACKs with same sequence number) as an indication that a segment has been lost. Following the TD indication, TCP performs the retransmission of what appears to be the missing segment, without waiting for the retransmission timer to expire.

Most TCP versions today implement the above discussed congestion control algorithms. TCP Reno in addition employs Fast Recovery, as explained in Allman et. al., "TCP Congestion Control," RFC 2581, 1999, that enables it to recover from segment loss in a window without a timeout. TCP NewReno can recover from multiple segment losses in a window via partial acknowledgements. TCP SACK can counter multiple segment loss as well, via selective acknowledgement (SACK) mechanism. Using selective acknowledgements, the receiver 102 can inform the source 101a about all the segments that have been received correctly. The source 101a can then retransmit the segments that have been lost. TCP SACK can employ congestion control algorithms similar to Reno, or can utilize information from its SACK options for congestion control procedures.

In a preferred embodiment, the slow start and congestion avoidance algorithms with maximum window size limitation are modelled and both TD and TO congestion events are considered. Most of the Reno implementations today have been rendered obsolete by SACK/NewReno deployment. It is hence assumed in the present invention that TCP is able to recover from multiple segment losses in a window in the event of TD loss indication. A TCP flavour may implement its own fast recovery process, for instance, the one assisted by SACK options (TCP SACK) or partial ACK mechanisms (TCP NewReno).

Figure 2:
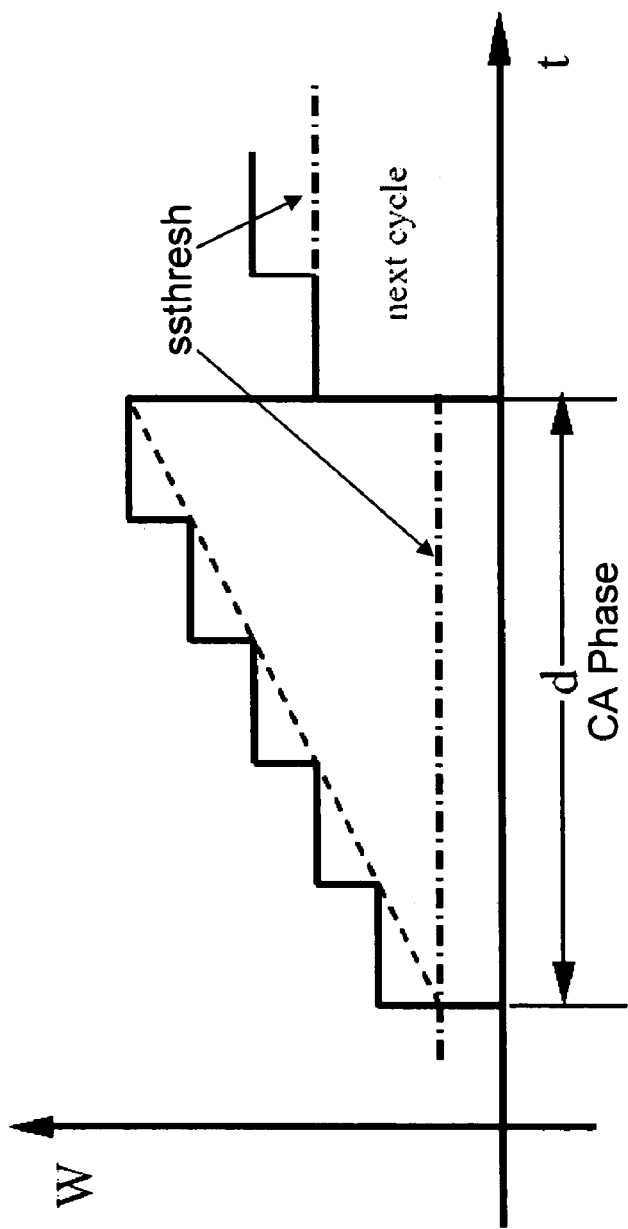
FIG. 2 shows a CAbegin cycle terminating via a Triple Duplicate loss indication.
Figure 3:
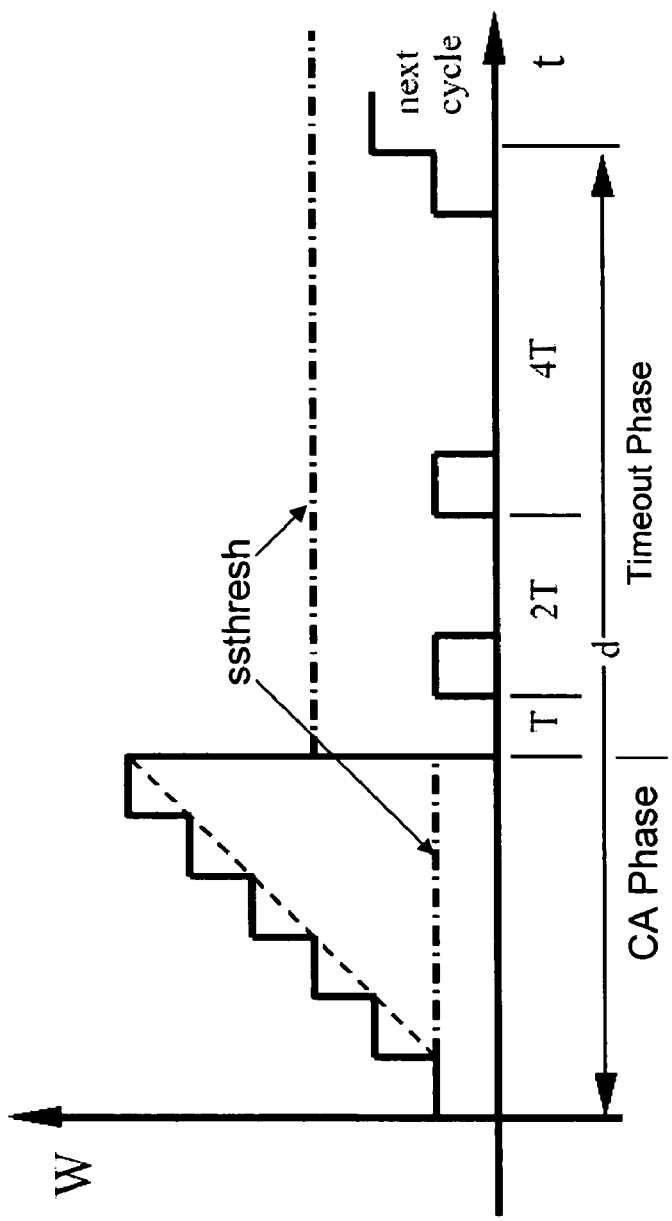
FIG. 3 shows a CAbegin cycle terminating via a Timeout loss indication.
Figure 4:
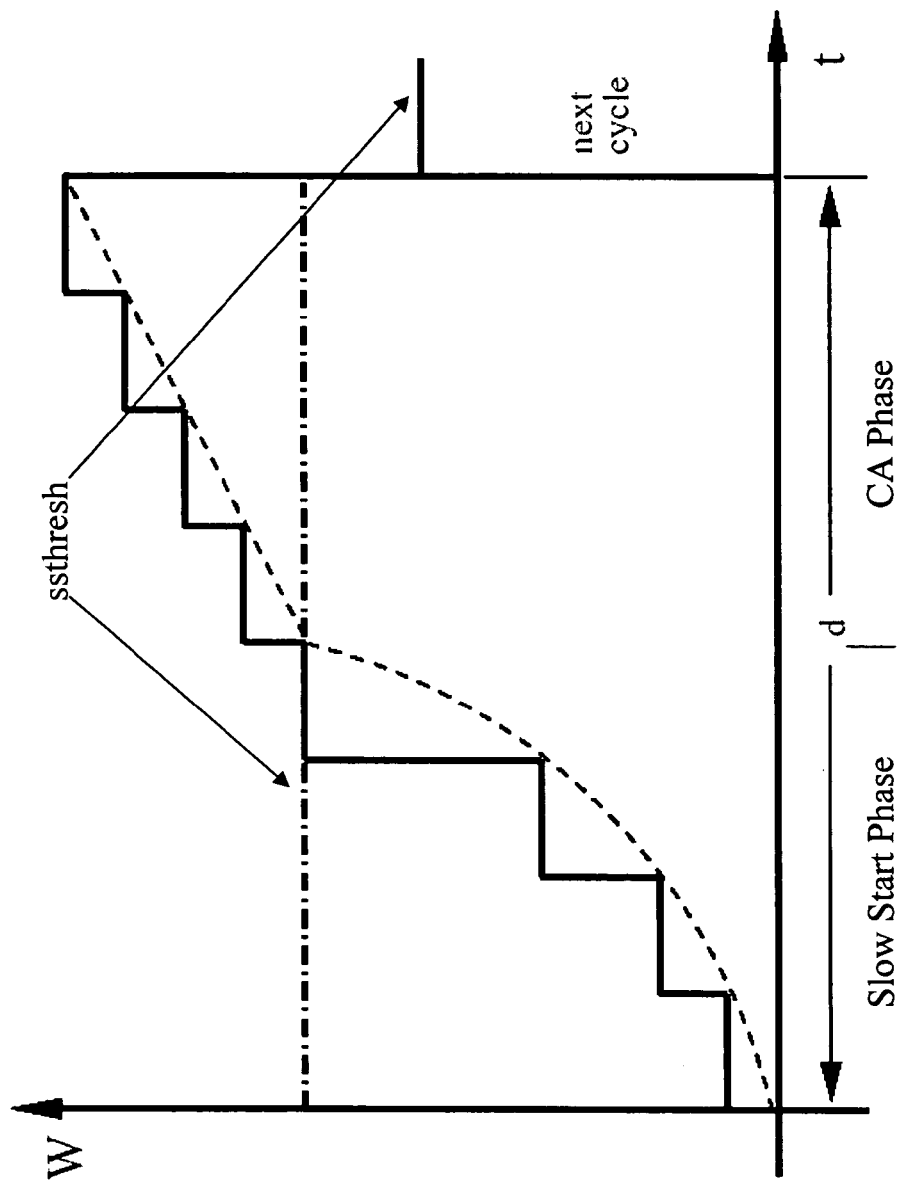
FIG. 4 shows a SSbegin cycle terminating via a Triple Duplicate loss indication.
Figure 5:
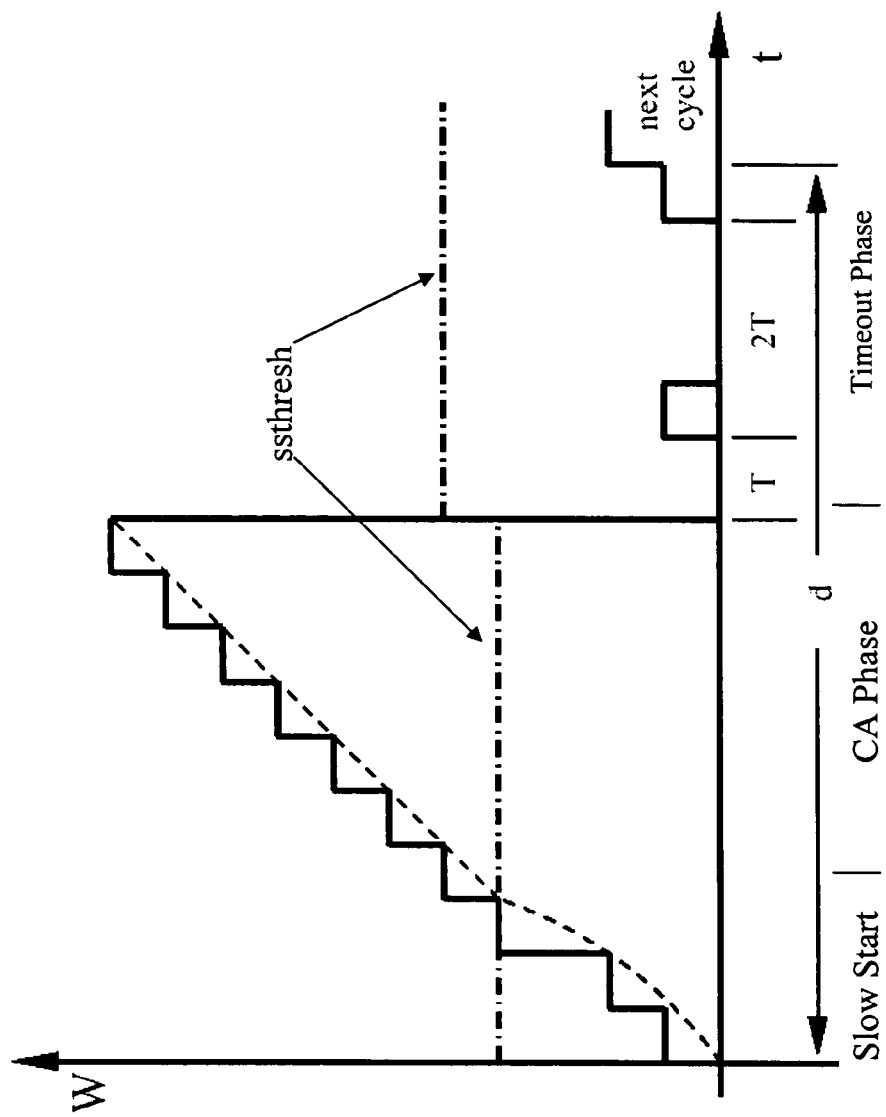
FIG. 5 shows a SSbegin cycle terminating via a Timeout loss indication.

In particular, a TCP's window size evolution is modelled in terms of window size variation patterns which are represented as in FIGS. 2, 3, 4, and 5. These window size variation patterns are termed as cycles. Two kinds of cycles are identified: the CAbegin cycles beginning in congestion avoidance phase, as shown in FIGS. 2 and 3 and the SSbegin beginning in slow start phase as shown in FIGS. 4 and 5. Each of these cycles can either end due to TD loss indication as shown in FIGS. 2 and 4 or due to a Timeout loss indication as shown in FIGS. 3 and 5. While the complete CAbegin cycle set comprises of CAbegin cycles beginning with all possible initial window sizes, the SSbegin cycle set contains cycles with different initial window sizes and slow start thresholds.

FIGS. 2 and 3 show the TCP window size (W) variation with time (t) in CAbegin cycles where ssthresh represents the slow start threshold and d the duration of the cycle. FIG. 2 represents a CAbegin cycle terminating via TD loss indication. The window size increases by one every round trip time (RTT) and is reduced by half at the end of cycle. FIG. 3 shows a CAbegin cycle terminating via TO indication. The window size increases by one every RTT in the congestion avoidance (CA) phase. The timeout duration in FIG. 3 doubles with every unsuccessful attempt to transmit the lost segment.

FIGS. 4 and 5 show the window size variation with time in SSbegin TCP cycles. FIG. 4 represents an SSbegin cycle terminating via TD loss indication. The window size first doubles during the slow start phase and then increases by one during the congestion avoidance phase every RTT, and is reduced by half at the end of cycle. FIG. 5 shows an SSbegin cycle terminating via TO loss indication. The window size first doubles during the slow start phase and then increases by one during the congestion avoidance phase every RTT.

The progression of SSbegin and CAbegin cycles is characterized in terms of rounds which are defined for a wireline case in Padhye et. al., "Modelling TCP Throughput: A Simple Model and its Empirical Validation," ACM SIGCOMM, p. 303-314, 1998.

Figure 6:
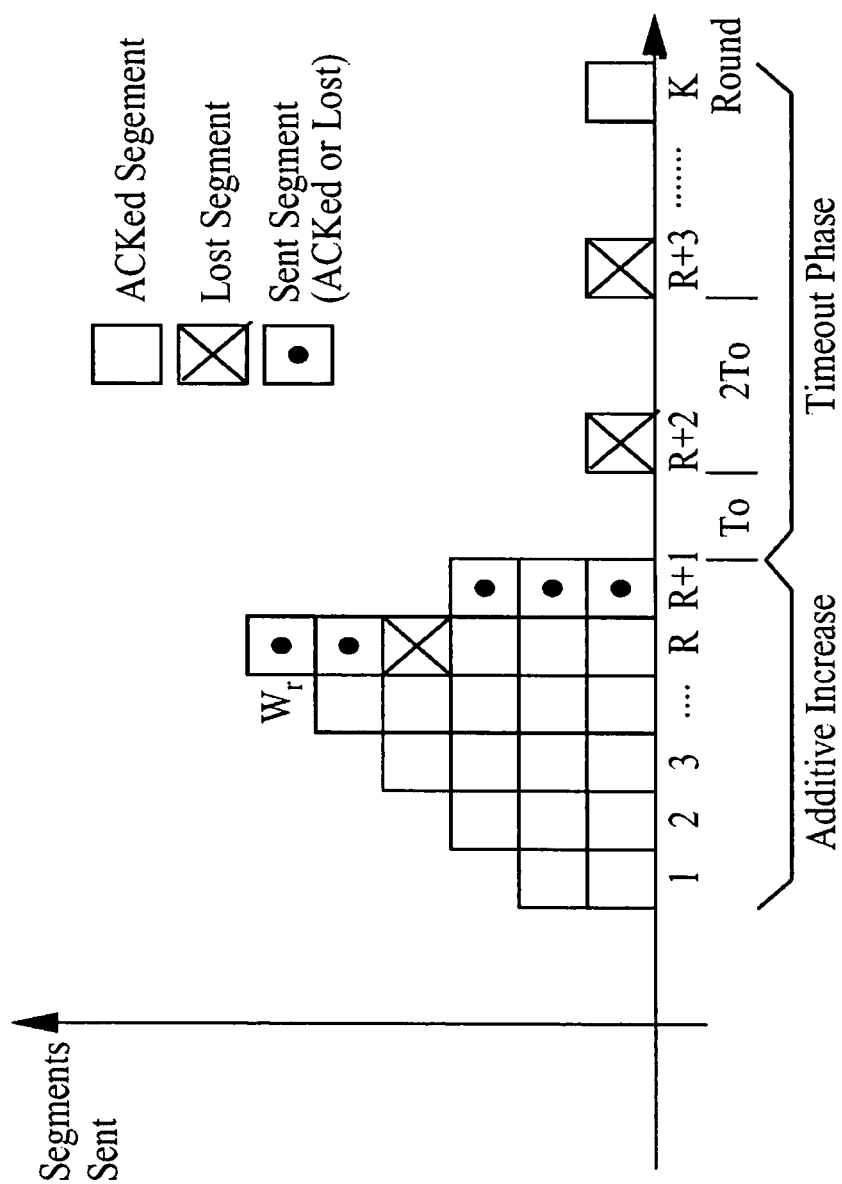
FIG. 6 shows the TCP segment transmission dynamics during a CAbegin TCP cycle.

An instance of TCP window size evolution with rounds is shown for a CAbegin cycle in FIG. 6. The beginning of a round is marked by the commencement of back-to-back transmission of a window or number of TCP segments. A round completes at a time which is the larger of the time of completion of window transmission and the time of arrival of an ACK for a segment in the window. The duration of a round can vary depending on the window size, the variation in transmission time of the frames on the wireless channel and also the RTT in wire-line domain. The window size in FIG. 5, designated as $W_r$ for round r, increases by one if all the segments transmitted in a round are ACKed. In the event of a segment loss in round R, the TCP cycle can end with a TD or a TO indication. The segments for instance the ones marked by a dot in FIG. 6 that can be sent following the lost segment while waiting for its ACK, are limited in number by the current window size $W_R$. When three or more of these segments are successful, duplicate ACKs for the lost segments are generated and a TD loss indication occurs. In that case, the cycle terminates at round R+1. We assume that TCP is able to recover from single or multiple losses in the window by using, for instance, SACK options. In the event that less than three segments make it successfully to the destination, TCP times out. On each subsequent attempt to transmit the unACKed segment, the timeout duration doubles. The cycle finally ends at round K when the lost segment is retransmitted successfully. An SSbegin cycle can be explained likewise in terms of its window size evolution in rounds.

An exemplary method and/or an exemplary embodiment of the current invention captures the trade-off between TCP throughput and the cost of segment transmission in a dynamic programming (DP) framework. The throughput optimization methodology involves controlling the segment success probabilities to minimize transmission cost and to maximize the throughput.

The optimization framework for TCP congestion control dynamics based on dissection of TCP operation into cycles is discussed next.

Figure 7:
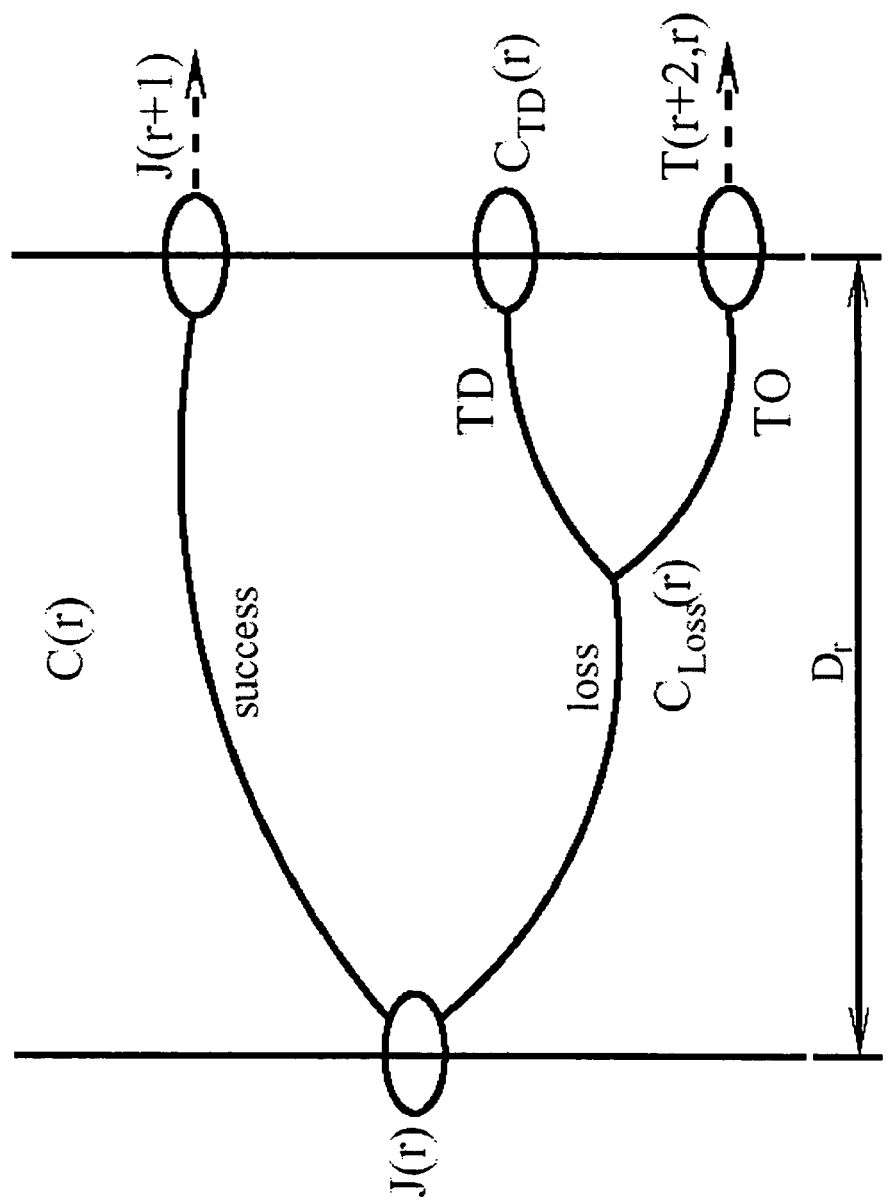
FIG. 7 shows the evolution of a slow start/congestion avoidance round for SSbegin and CAbegin cycles.
Figure 8:
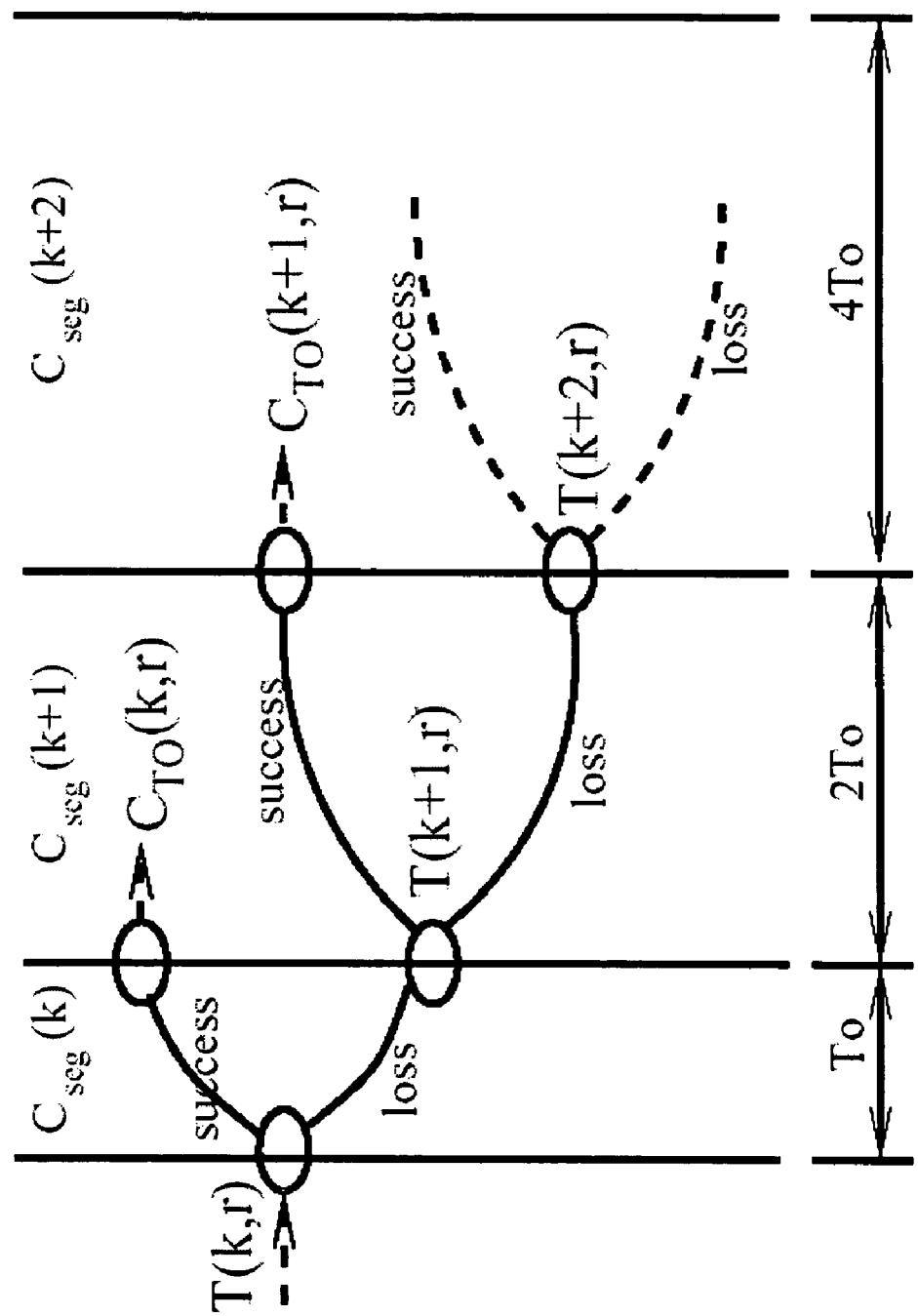
FIG. 8 shows the evolution of timeout phase for SSbegin and CAbegin cycles.

FIGS. 7 and 8 depict the methodology. The dynamics of a round in slow start or congestion avoidance phase are shown in FIG. 7. Dr denotes the duration of round r. In the optimization framework, a cost is incurred for the transmission of a number of segments in every round, wherein the number of segments is defined by the actual window size of that round. The cost may be attributed to, for example the transmission time on the wireless channel, and is represented by C(r). The total cost to be incurred, called the cost-to-go, starting from round r until the end of the cycle is represented by J(r). In case a segment in the round is lost, $C_{Loss}(r)$ is incurred in addition to C(r). If there is a TD loss indication, the cycle ends at round r+1, e.g. round R+1 in FIG. 6 which involves the transmission of a number of segments following the segment for which TD loss indication occurred. $C_{Loss}(r)$ for the TD loss indication case is thus ascertained as the terminal cost of the cycle. The terminal cost is the negative of the TCP throughput achieved during the cycle, with the TCP throughput evaluated as the number of TCP segments transmitted during the cycle divided by the duration of the cycle. This formulation of the terminal cost enables a cost minimization objective function to prefer high cycle throughputs owing to greater associated cost deduction.

In the event that the loss indication is a timeout, $C_{Loss}(r)$ represents the cost incurred during the Timeout Phase as shown in FIG. 8. The cost of the timeout phase is given by T(r+2, r) where T(k,r) (k>r+1) represents the cost to go from round k given that the timeout occurred due to the loss indication of a segment in round r. It is noted here that as in the TD loss indication case, round r+1 involves the transmission of a segment window following the lost segment. T(k, r) is depicted in FIG. 8. During round k in the timeout phase, the cost corresponding to the transmission of a segment is termed as $C_{seg}(k)$. In case the segment transmitted during round k is successfully ACKed, the timeout phase and the cycle ends with a termination cost $C_{TO}$ which is the negative of the throughput achieved during the cycle.

The optimization approach for the discussed framework is motivated by Dynamic Programming principles as explained in Bertikas, "Dynamic Programming and Optimal Control," Athena Scientific, Belmont, Mass., 2001, and involves minimization of cost-to-go J(r). The cost symbols in FIGS. 7 and 8 will hitherto be reused to formulate detailed optimization equations for TCP throughput. In the optimization framework, $\vec{\gamma}$ represents the channel condition vector corresponding to the wireless channel states encountered by the segments in a round and $\vec{c}$ represent the network congestion states experienced by the segments. The dimension of $\vec{\gamma}$ depends on the number of segments transmitted in a round, the number of radio blocks required to transmit the segments, and the channel variation during the transmissions. For instance, when the channel decorrelates over transmission duration of a radio block and remains constant in the interim, the dimension of $\vec{\gamma}$ can be taken as the number of blocks required to transmit all the TCP segments in the round. The congestion vector $\vec{c}$ has a dimension equal to the number of segments in a round. The quantities $\vec{\gamma}$ and $\vec{c}$ together ascertain the success of TCP segments in a round. A reliable TCP ACK delivery is assumed. The channel and congestion state vectors have probability distribution functions denoted by $$f_{\vec{\gamma}}(\vec{\gamma}) \text{ and } f_{\vec{c}}(\vec{c})$$

respectively. The success probability vector of segments in the round is denoted by $\vec{s}$. The success probability of a round is a function of $\vec{s}$, and can be expressed as $S_{rnd}(\vec{s})$. The cost C of round r depends on the success probability of the segments, the wireless channel state vector, the congestion state vector, and the round number.

The key to the optimization process is to ascertain the optimal segment success probability vectors $\vec{s}$, for all given $\vec{\gamma}$ and $\vec{c}$. The set of these vectors results in the lowest cost-to-go averaged over the channel state and congestion distribution. J(r) can thus be represented as the cost-to-go minimized over all possible success probability vectors:

$$J(r) = \int_{\vec{\gamma}} \int_{\vec{c}} \min_{\vec{s}} [C_{tg}(r, \vec{s}, \vec{\gamma}, \vec{c})] f_{\vec{\gamma}}(\vec{\gamma}) f_{\vec{c}}(\vec{c}) d\vec{\gamma} d\vec{c} \quad (1)$$

where the cost-to-go for given $\vec{\gamma}$ and $\vec{c}$ is $$C_{tg}(r, \vec{s}, \vec{\gamma}, \vec{c}) = C(r, \vec{s}, \vec{\gamma}, \vec{c}) + S_{rnd}(\vec{s})J(r+1) + (1 - S_{rnd}(\vec{s}))C_{Loss}(r, \vec{s}) \quad (2)$$

The terminal cost $C_{Loss}(r, \vec{s})$ incurred on the loss of one or more segments in round r can be expressed as $$C_{Loss}(r, \vec{s}) = \int_{\vec{\gamma}'} \int_{\vec{c}'} \min_{\vec{s}'} \{p_{TD}(r, \vec{s}, \vec{s}')[C_L(r, \vec{s}', \vec{\gamma}', \vec{c}') + C_B(r)] + (1 - p_{TD}(r, \vec{s}, \vec{s}'))T(r+2, r)\} d\vec{\gamma}' d\vec{c}' \quad (3)$$

The vectors $\vec{\gamma}'$, $\vec{c}'$ and $\vec{s}'$ respectively denote the channel state, congestion vector, and success probabilities of the segments in round r+1 (e.g. round R+1 in FIG. 6) for the case when there is TD loss in round r.

$$p_{TD}(r, \vec{s}, \vec{s}')$$

represents the probability of a TD loss indication, and can be evaluated as the probability of three or more segments being successful amongst the ones in round r+1 and those transmitted following the first lost segment in round r. The formulation of $$p_{TD}(r, \vec{s}, \vec{s}')$$

will be discussed later.

$$C_L(r, \vec{s}, \vec{\gamma}, \vec{c})$$

represents the cost associated with transmission of segments in round r+1. Round r+1 is the terminal round for a TD loss indication. $C_B(r)$, the terminal cost for the TD loss case, is modelled as the negative of throughput attained during the cycle:

$$C_B(r) = \lambda \left( -\frac{\sum_{i=1}^{T} W_i + n_l}{\sum_{i=1}^{r} D_i} - \rho(W_r) \right) \quad (4)$$

where $D_i$ represents the duration of round i, $n_l$ is the number of segments transmitted in the terminal round r+1 of TD loss case, $W_i$ represents the window size during round i, and $\lambda$ is the scaling factor between the transmission and throughput costs. The term $-\rho(W_r)$, where $\rho$ is an increasing function of $W_r$, is introduced to influence the evolution of the current cycle to favour high throughput in the subsequent cycle. For instance, when a congestion avoidance phase ends in a TD loss indication with terminal round window of Wr, the next cycle would have a initial window size of Wr/2. To favor a higher initial window size for the next cycle, the cost for the current cycle is made to have a deduction which is an increasing function of $W_r$. By virtue of the cost deduction, termination of a cycle with a larger window size would be preferred, since the overall objective is to minimize the cost of a cycle.

The event that loss indication in a cycle is a timeout is represented by probability $$1 - p_{TD}(r, \vec{s}, \vec{s}')$$

in (3). In accordance with the dynamics represented in FIG. 8, the corresponding cost-to-go from round k of the timeout phase, given that the TO indication occurred in round r, is given by $$T(k, r) = \int_{\vec{C}} \int_{\vec{\gamma}} \min_s [C_{seg}(r, s, \vec{\gamma}, \vec{c}) + sC_{TO}(k, r) + \qquad (5)$$
$$(1 - s)T(k + 1, r)] f_{\vec{\gamma}}(\vec{\gamma}) f_{\vec{c}}(\vec{c}) d\vec{\gamma} d\vec{c},$$

where s is the success probability of the transmitted segment, and $C_{TO}$ represents the terminal cost for the cycle ending in a timeout:

$$C_{TO}(k, r) = \lambda \left( \frac{\sum_{i=1}^{r} W_i + n_l + (k - (r + 1))}{\sum_{i=1}^{r+1} D_i + f(k - (r + 1))T_O} - \rho(W_r) \right). \qquad (6)$$

where To is the timeout value and f(i) denotes the timeout sequence given by $$f(i) = \begin{cases} 2^i - 1, & i \leq 7 \\ 127 + 64(i - 7), & i \geq 8 \end{cases} \qquad (7)$$

The optimization framework discussed above can be applied to both CAbegin and SSbegin cycles via the associated window evolutions. Given the initial window size value, the window sizes during the rounds of SSbegin cycle can be determined which result in a linear increase until a loss indication occurs. Similarly with a given initial window size and slow start threshold, the window sizes can be determined for rounds of CAbegin cycle. Then, the solution to optimization equations yields the cost minimizing segment success probability vector for all possible channel state and congestion vectors during the rounds of a cycle.

Link-Layer Adaptation in EGPRS Networks

Based on the presented optimization framework, the enhancement in TCP's performance via adaptive link layer measures are discussed next. As an exemplary demonstration, the benefits of the optimization procedure are evaluated for EGPRS networks.

GSM has been evolving towards a $3^{rd}$ generation mobile cellular system with the standardization of technologies like EDGE and GPRS. EGPRS is the part of EDGE technology targeted towards the enhancement of GPRS, which is the packet data component of GSM. While the fundamental physical layer specifications of GSM, i. e. TDMA bursts, channel spacing, etc., are retained in EGPRS, enhancements like multi-level modulation, better code granularity, and incremental redundancy are introduced to increase the link layer throughput.

As an embodiment, it will hitherto be demonstrated that TCP dynamics aware link-layer adaptation entails, for users in the EGPRS network, increased TCP throughput over conventional link-layer adaptation methods. The attainable user-throughput in an EGPRS network decreases with an increase in the number of admitted users. This throughput reduction can be compensated by employing TCP dynamics aware link-layer adaptation. Hence more of users can then be admitted in the network while retaining the same level of user-throughput.

Figure 9:
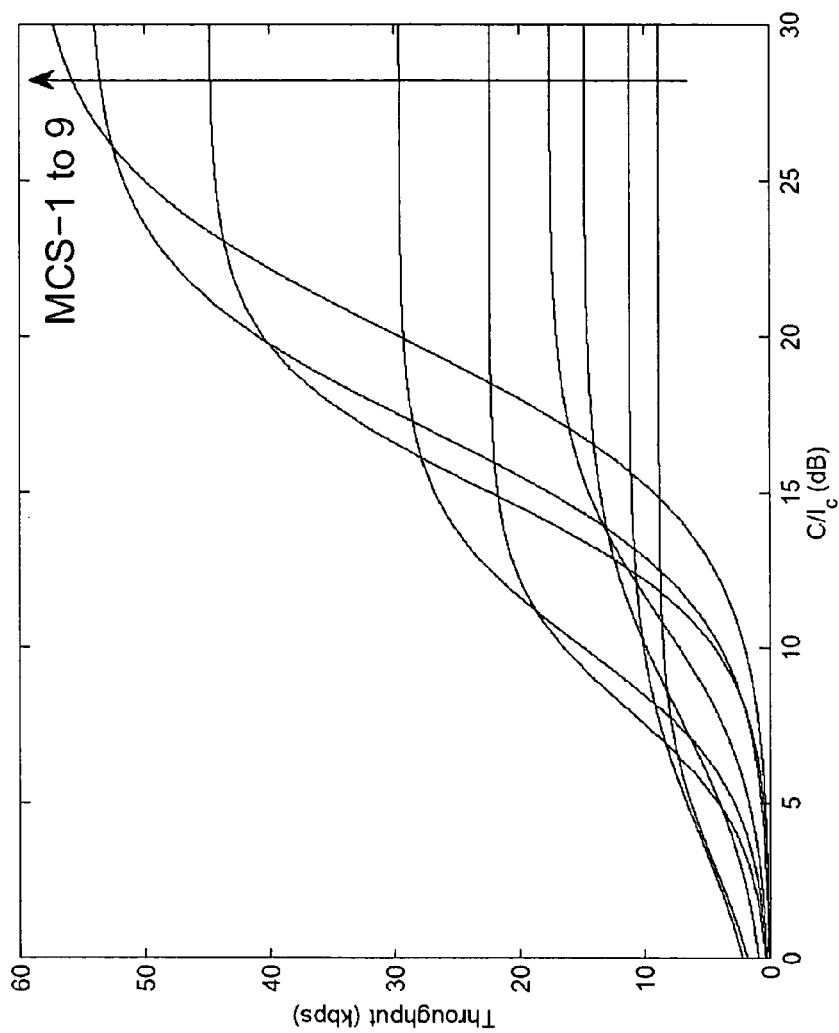
FIG. 9 shows EGPRS throughput performance for TU03 frequency-hopping and interference-limited scenario.

EGPRS employs nine coding schemes five of which (MCS 5 to MCS 9) are 8-PSK modulated and the remaining use GMSK modulation. Each of the coding schemes has different puncturing patters. MCS 1, 2, 5 and 6 have two classes of puncturing patterns (P1 and P2), while the remaining coding schemes have three classes, namely P1, P2 and P3. A Packet Data Unit (PDU) from the Logical Link Control (LLC) layer is transmitted via Radio Link Control (RLC) blocks and the amount of data fitted into a block is decided by the coding scheme used for transmission. The process of matching the coding scheme to the prevailing radio link conditions is called Link Adaptation (LA). Together with Incremental Redundancy (IR), LA constitutes the main component of Link Quality Control (LQC) [MFL02] for EGPRS. IR involves the combination of retransmitted RLC data blocks with the previous transmission attempts of the block. For example consider that MCS-9 is used to transmit a data block. The block will first be transmitted using the puncturing scheme P1. If the received block is in error, retransmission will be performed using puncturing scheme P2. The receiver, e. g. host 102 does not discard the previously transmitted block but uses it for joint decoding with the current retransmission, thereby resulting in a lower effective code rate. The throughput performance of EGPRS coding schemes has been studied in several works including Molkdar et. al., "An Overview of EGPRS: the packet data component of EDGE," Electronics and Communications Engineering Journal, 2002, where the throughput for a TU ideal frequency hopping and interference-limited scenario is presented for different EGRPS coding schemes, as a function of C/Ic (ratio of carrier power to co-channel interference). The plots, which have been parameterized in Krishnaswamy, "Network-assisted Link Adaptation with Power Control and Channel Re-assignment in Wireless Networks," 3G Wireless Conference, p. 165-170, 2002, are reproduced in FIG. 9. The throughput in these plots is evaluated by assessing the Block Error Rate (BLER) as a function of C/Ic and using the relation $$\text{Throughput} = [1 - \text{BLER}_{C/Ic}]R_{MCS-X} \qquad (8)$$

where $R_{MCS-X}$ is the user data rate for the coding scheme MCS-X. It is being noted here that the evaluation of BLER for obtaining throughput plots for different coding schemes can be done by noting the number of transmissions required for successful delivery of a data block at a given C/Ic and without IR recombination. The IR recombination is shown to reduce this BLER. The probability that a data block transmitted via MCS-1 to 9 modes is in error can thus be obtained by noting the throughput for a given C/Ic from FIG. 9 and using the relation (8).

TABLE 1

Parameters for MCS-1 to 9. R1 + 2 and R1 + 2 + 3 denote effective code rates on IR recombination of a block with

| Mode | Data per Block | Rate | R | $R_{1+2}$ | $R_{1+2+3}$ |
|---|---|---|---|---|---|
| MCS-1 | 176 bits | 8.8 kbps | 1 | 0.5 | .33 |
| MCS-2 | 224 bits | 11.2 kbps | 0.92 | 0.46 | 0.31 |
| MCS-3 | 296 bits | 14.8 kbps | 0.76 | 0.38 | 0.25 |

TABLE 1-continued

Parameters for MCS-1 to 9. R1 + 2 and R1 + 2 + 3 denote effective code rates on IR recombination of a block with

| Mode | Data per Block | Rate | R | $R_{1+2}$ | $R_{1+2+3}$ |
|------|----------------|------|------|------|------|
| MCS-4 | 352 bits | 17.6 kbps | 0.49 | 0.24 | — |
| MCS-5 | 448 bits | 22.4 kbps | 0.37 | 0.19 | — |
| MCS-6 | 592 bits | 29.6 kbps | 1 | 0.5 | 0.33 |
| MCS-7 | 896 bits | 44.8 kbps | 0.85 | 0.42 | 0.28 |
| MCS-8 | 1088 bits | 34.4 kbps | 0.66 | 0.33 | — |
| MCS-9 | 1184 bits | 59.2 kbps | 0.53 | 0.26 | — |

The data bits per block for each of the transmission modes (MCS-1 to 9) and the associated data rates, modulation schemes and coding rates as noted in Furuskar et. al., "System Performance of the EDGE Concept for Enhanced Data Rates in GSM and TDMA/136," IEEE Wireless Communications and Networking Conference 1999, are presented in Table 1. The selection of coding schemes as per prevailing radio conditions alone may not be optimal for TCP traffic. As it will be demonstrated, coding scheme selection as per TCP dynamics and prevailing radio conditions results in better transport layer throughput.

For demonstrating the application of TCP throughput optimization framework, a slow frequency hopping scenario in an EGPRS network is considered where the transmission frequency is updated every 20 ms TDMA burst. The block error process thus decorrelates over different EGPRS bursts. In the optimization framework, the channel state vector $\vec{\gamma}$ is represented as the SNR experienced on the wireless channel by the TCP segments encapsulated in the link-layer data blocks. Then $\gamma_1, \gamma_2, \ldots, \gamma_{W_r}$ can be represented as the components of SNR vector $\vec{\gamma}$ for round r. In a real EGPRS scenario a single TCP segment would be transmitted via multiple EGPRS blocks which encounter different channel SNRs: this general case will be addressed later and at the moment a single SNR value is associated with a TCP segment in the optimization framework. The congestion in the network, $\vec{c}$ in (1), (2), (3) and (5) is modelled as a constant TCP segment loss process. It is assumed that the wireless link adaptation process does not have information pertaining to the network congestion, as would be the case in a real scenario. The optimization is hence not performed over congestion characteristics.

The cost of a round (C in (2)) is modelled in terms of the transmission cost of the segments in the round, $$\sum_{j=1}^{W_r} T_{seg}(s_j, \gamma_j)$$

which represents the total time over the air during which EGPRS bursts containing the data corresponding to TCP segments in a window are transmitted, with $\gamma_j$ denoting the C/Ic of the channel for segment j.

For the above described scenario (1) can be represented as (9). (1) may be used for the determination of the cost-minimizing success probability vector $\vec{s}$ in a round for every given $\vec{\gamma}$ and the time required for transmission of segments. However, there are practical limitations to adopting the optimization guidelines on the fly. When transmission of segments in a round commences, only an estimate of SNR for the current frame transmission might be available, and it might be difficult to predict the SNRs for all segment transmission in the current round. The optimization formulation is hence modified to yield a causal cost model. The targeted packet success probability is selected to be the same for all segments in the round. Then $\vec{s}$ simplifies to a single-element optimization parameter s. It is also assumed that for the case when there is a loss indication in a round, the target success probability of the following round (e.g. round R+1 in FIG. 6) is the same as that of the current round. Then, the cost formulation J(r), with no a priori knowledge of $\vec{\gamma}$, is given by (10). Accordingly, (5) reduces to (13).

For the described scenario, the timeout cost (3) can be expressed as (11).

$$J(r) = \int_{\vec{\gamma}} \min_{\vec{s}} \left[ \sum_{j=1}^{W_r} T_{seg}(s_j, \gamma_j) + \left(\prod_{j=1}^{W_r} s_j\right) J(r+1) + \left(1 - \prod_{j=1}^{W_r} s_j\right) C_{Loss}(r, \vec{s}) \right] f_{\vec{\gamma}}(\vec{\gamma}) d\vec{\gamma} \quad (9)$$

$$J(r) = \min_s \left[ W_r \int_{\gamma} T_{seg}(s, \gamma) f_\gamma(\gamma) d\gamma + s^{W_r} J(r+1) + (1 - s^{W_r}) C_{Loss}(r, s) \right] \quad (10)$$

$$C_{Loss}(r, s) = p_{TD}(r, s) \left[ n_l \int_{\gamma'} T_{seg}(s, \gamma') f_{\gamma'}(\gamma') d\gamma' + C_B(r) \right] + [1 - p_{TD}(r, s)] T(r+2, r) \quad (11)$$

$$p_{TD}(r, s) = \frac{1}{(1 - s^{W_r})} \sum_{i=1}^{W_r} s^{i-1}(1-s) [I_{\{W_r > 3\}} \sum_{j=3}^{W_r-1} \binom{W_r - 1}{j} s^j (1-s)^{W_r-1-j}]$$

$$= \left[ \sum_{j=3}^{W_r-1} \binom{W_r - 1}{j} s^j (1-s)^{W_r-1-j} \right] I_{\{W_r > 3\}} \quad (12)$$

$$T(k, r) = \min_s \left[ \int_{\gamma} T_{seg}(s, \gamma) f_\gamma(\gamma) d\gamma + sC_{TO}(k, r) + (1-s) T(k+1, r) \right] \quad (13)$$

The evaluation of $P_{TD}(r, s)$, the probability of a TD loss indication conditioned on the event that a segment is lost in round r, is discussed next. A TD indication occurs when three or more segments in the window starting at the first lost segment in round r are successful. The probability of one of more segments in a round being lost is given by $(1-s^{W_r})$, where s is the target success probability for segments in a round. The probability that the first segment lost in a round is the $i^{th}$ one is given by $s^{i-1}(1-s)$. The formulation for $p_{TD}(r, s)$ is then given by (12) where $I_{\{W_r>3\}}$ is the indicator function which assumes a value of 1 when Wr>3 and is 0 otherwise.

The approach for evaluating TCP throughput with adaptive link-layer techniques is discussed next.

In (10), J(r) can be determined via minimization over s if J(r+1) is known. T(k, r) in (13) has a similar forward dependence on T(k+1, r). Based on finite-state dynamic programming principles, the optimization equations (10) and (13) can be solved backwards in round number. Round numbers $R_t$ and $K_t$, defined to be the terminal rounds for evaluation of optimization solutions to (10) and (13) respectively, are selected as 200 each. The costs J(Rt+1) and T(r+Kt+1, r)) equal zero. (10) and (13) can then be solved backwards in round number together with (11), (12), (4), (6) and (7). However, the timeout period optimization in (13) is required to be solved for timeout rounds for every possible termination of congestion avoidance phase (at round 1 to round $R_t$). This bears heavily upon the computational complexity and storage in a real-time system. An approximation for estimation of timeout cost is hence made. The cost T(r+2, r) in (11) represents the cost-to-go for the timeout phase beginning at round r+2, given that loss indication occurred at round r. It incorporates a running transmission time cost and a termination cost $C_{TO}$. Now instead of the optimization formulation (13), the cost-to-go for the timeout phase is approximated as the termination cost after three timeout rounds, which can be expressed as $C_{TO}$(r+5, r) with $C_{TO}$(k, r) given by (6). This in essence means that the transmission cost modelling in timeout phase is disregarded, and thus the computational complexity is reduced by not having to solve for link adaptation measures. The evaluations that will be presented later show that the timeout phase approximation does not cause any noticeable reduction in optimal TCP performance and considerable throughput enhancement is realized inspite of the timeout phase approximation. The timeout phase assumption will be restricted to optimization solutions and will not be carried over to simulations of TCP dynamics.

The complete sample set for minimization over s in (10) would consist of all possible ways of transmission of TCP segment data via EGPRS blocks. The segment success probability for each element in this set and the corresponding cost $T_{seg}(s)$ can be ascertained, and optimization be performed. However, the required computation complexity becomes intractable. The segment success probability sample set ($S_{set}$) is hence restricted by only considering identical modes to be employed for transmission of blocks carrying TCP segment data. The cardinality of $S_{set}$ then reduces to the number of modes of transmission. The identical mode transmission assumption is limited to the evaluation of $S_{set}$ and is not carried over to the selection of modes for transmission of TCP segment via EGPRS modes. $S_{set}$ is evaluated as $$S_{set} = \{1 - \overline{SER}(1), \ldots 1 - SER(9)\} \tag{14}$$

$\overline{SER}(m)$ in (14) represents the average error probability for transmission of segment via blocks of mode-m, and is given by $$\overline{SER}(m) = [\overline{BLER}_{RTX}(m)]^{nBlocks(m)} \tag{15}$$

where nBlocks(m) denotes the number of blocks of mode-m required to transmit a TCP segment and $$\overline{BLER}_{RTX}(m)$$

is the average block error rate for mode-m with ARQ retransmissions and is ascertained as $$\overline{BLER}_{RTX}(m) = \prod_{r=1}^{RTL} \overline{BLER}_r(m) \tag{16}$$

$BLER_r(m)$ in the above equation represents the average (over channel state) error probability of a block when transmitted via mode-m. The subscript r denotes the transmission attempt and varies from 1 for first transmission to the retransmission limit RTL for the last one (RTL includes all transmission of a data block, including the first one). The transmission attempts yield different block error probabilities because of IR combination. A retransmission of a data block is combined with all previous transmissions attempts of the block cached at the receiver. This results in a lower effective code rate and hence a lower block error rate. The average cost $T_{seg}(S_m)$ corresponding to a success probability element $s_m$ in $S_{set}$ is evaluated as nBlocks(m)$T_{block}$(m) where $T_{block}$(m) is the average time spent on the transmission of a mode-m block. $T_{block}$(m) is given by $$\overline{T}_{block}(m) = \sum_{K=1}^{RTL} \prod_{r=1}^{K-1} \overline{BLER}_r(m)(1 - \overline{BLER}_K(m))(KT_{burst}) + \prod_{r=1}^{RTL} \overline{BLER}_r(m)(RTLT_{burst}) \tag{17}$$

$T_{burst}$ in the above equation represents the duration of an EGPRS radio burst and has a value of 20 ms. The function $\rho(W_r)$, in (4) and (6) is taken to be $W_r/2$ and $n_1$ is approximated as $W_r/2$.

With the reduced success probability set $S_{set}$ and the corresponding costs evaluated as described, dynamic programming solutions to (10) can be obtained for various cyclic patterns. For example the following procedure is performed for the CAbegin cycle and for a range of values of the cost ratio λ. A look up table $S_{opt}^{CA}$ composed of target success probability $S_{opt}^{CA}(r, W_{init})$ for every round number r in the congestion avoidance phase, and every initial window size $W_{init}$ is generated. For a given round and initial window, the value s that minimizes the integrands in (12) is the success probability stored in the look up table. $W_{init}$ ascertains the evolution of window size in a cycle for determining the terminal costs (4) and (6), and can take values from 1 to the maximum window size, $W_{max}$.

The target success probability for the slow start and congestion avoidance phases in the SSbegin cycle is in addition to $W_{init}$ a function of the slow start threshold ssthresh at the beginning of the cycle, and can be expressed as $S_{opt}^{CA}(r, W_{init}, ssthresh)$: these values constitute the look-up table $S_{opt}^{SS}$.

For the transmission of TCP segments during slow start and congestion avoidance phases, the optimal segment success probability $s_{opt}(r)$ can be drawn for round r, from the appropriate look-up tables for SSbegin or CAbegin cycles depending on the nature of the current cycle and the associated $W_{init}$ and ssthresh for SSbegin cycle values. If the round r falls in timeout phase, $s_{opt}(r)$ is taken to be the maximum, across all rounds, of the success probabilities for the cycle noted in the look-up table. The choice is justified, since the timeout phase is detrimental to TCP performance and can be exited via successful segment transmission. Following the selection of segment success probability, the choice of modes for transmission of EGPRS blocks carrying the TCP segment needs to be made. The identical mode transmission assumption employed for the evaluation of $S_{set}$ and the corresponding cost set is not carried over to the TCP dynamics aware link adaptation algorithm. If the estimated C/Ic for the current burst is γ, then mode $m_b$ which minimizes the cost of deviation from the target success probability and transmission time is selected for block transmission. Mode $m_b$ is given by $$m_b = \min_{m \in \{1,\ldots 9\}} [(s_{target}(r,m) - s_{mode}(\gamma,m))^+ + \beta(t_{target}(r,m) - t_{mode}(\gamma,m))^+] \quad (18)$$

where $\beta$ is the cost ratio, and the function $(x)+$ represents $\max\{0, x\}$. $s_{target}(r,m)$ and $t_{target}(r,m)$ respectively represent, for mode-m and round r, the target success probability and target transmission as required by the optimization methodology for transmission. $s_{mode}(\gamma,m)$ and $t_{mode}(\gamma,m)$ on the other hand represent the estimate of success probability and transmission time that can be offered by mode-m for a C/Ic of $\gamma$. The target success probability for mode selection is taken to be $$s_{target}(r,m) = [s_{opt}(r)]^{\frac{1}{nBlocks(m)}} \quad (19)$$

Similar to the $S_{set}$ evaluation assumption of segment transmission via identical modes, the estimation of target block error probability from segment error probability in (19) is done by raising $s_{opt}$ (an element of $S_{set}$) to the inverse power of nBlocks(m). However, the actual transmission of a segment is not restricted by identical mode transmission assumption and, as we will describe later in this subsection, occurs via blocks of different modes ascertained to be optimal by the mode selection policy (18). The block success probability $s_{mode}(\gamma,m)$ in (18) is ascertained as $$i.\ s_{mode}(\gamma,m) = [1 - BLER_{RTX}(\gamma,m)] \quad (20)$$

where $BLER_{RTX}(\gamma,m)$ is the estimate of block error rate offered by mode-m with ARQ retransmissions. As the C/Ic values for possible attempts to retransmit the block are not known prior to transmission, the value of $BLER_{RTX}(\gamma,m)$ cannot be determined in advance. However, $BLER_{RTX}(\gamma,m)$ can be estimated by employing average block error rate for retransmission attempts. Then, having information pertaining only to the current block transmission, $BLER_{RTX}(\gamma,m)$ can be ascertained as $$BLER_{RTX}(\gamma,m) = BLER_1(\gamma,m) \prod_{r=2}^{RTL} \overline{BLER_r}(m) \quad (21)$$

The target time $t_{target}(r,m)$ in (18) is taken as $$ii.\ t_{target}(r,m) = \frac{\overline{RTT}}{W_r nBlocks(m)} \quad (22)$$

where $\overline{RTT}$ is the running average round trip time as maintained by a TCP implementation, for example, as suggested in Paxson et. al., "Computing TCP's Retransmission Timer," RFC 2988, 2000) of a TCP segment, and $W_r$ is the TCP window size. Finally, the transmission time estimate for a mode-m block transmission is taken to be $t_{mode}(m) = T_{block}(\gamma,m)$, where $T_{block}(\gamma,m)$ is given by $$T_{block}(\gamma,m) = [1 - BLER_1(\gamma,m)]T_{burst} + BLER_1(\gamma,m) \quad (23)$$

$$\sum_{K=2}^{RTL} \prod_{r=1}^{K-1} \overline{BLER_r}(m)(1 - \overline{BLER_K}(m))(rT_{burst}) +$$

$$BLER_1(\gamma,m) \prod_{r=2}^{RTL} \overline{BLER_r}(m)(RTLT_{burst})$$

The three terms separated by addition signs in (23) respectively represent the cases of block transmission success at first attempt, success at $K^{th}$ attempt (2=K=RTL), and failure across all attempts. As long as there is outstanding TCP segment data to be transmitted, transmission modes are selected according to equation (18). If the transmission is successful, the transmitted data is removed from the payload buffer. Mode selection as per the present channel conditions is then done again to transmit the remaining TCP segment data. The process is repeated until the segment is completely transmitted.

The Early Round Protection (ERP) Scheme

The ERP scheme targets TCP throughput enhancement in wireless networks, and is based on the observation that earlier rounds in a TCP cycle are crucial for attaining higher throughput and need a transmission bias, e.g. robust modulation and coding, to provide a greater success rate to the segments. This is so because if there is a segment loss before the bandwidth-delay product of the network is filled by TCP data, the TCP window size is reduced, and hence the throughput takes a hit. For the case when the maximum TCP window size permits transmission of more data than what is required to fill the bandwidth-delay product of the network, then the round adaptive transmission of data blocks need be done only up to a limit of growth of window size. As per the ERP scheme, adaptive mode selection is done for EGPRS following the measures highlighted in the previous subsections. After the growth of window size beyond a limit $W_{erp}$, ordinary LA/IR adaptation procedures for data transmission take over.

Figure 10:
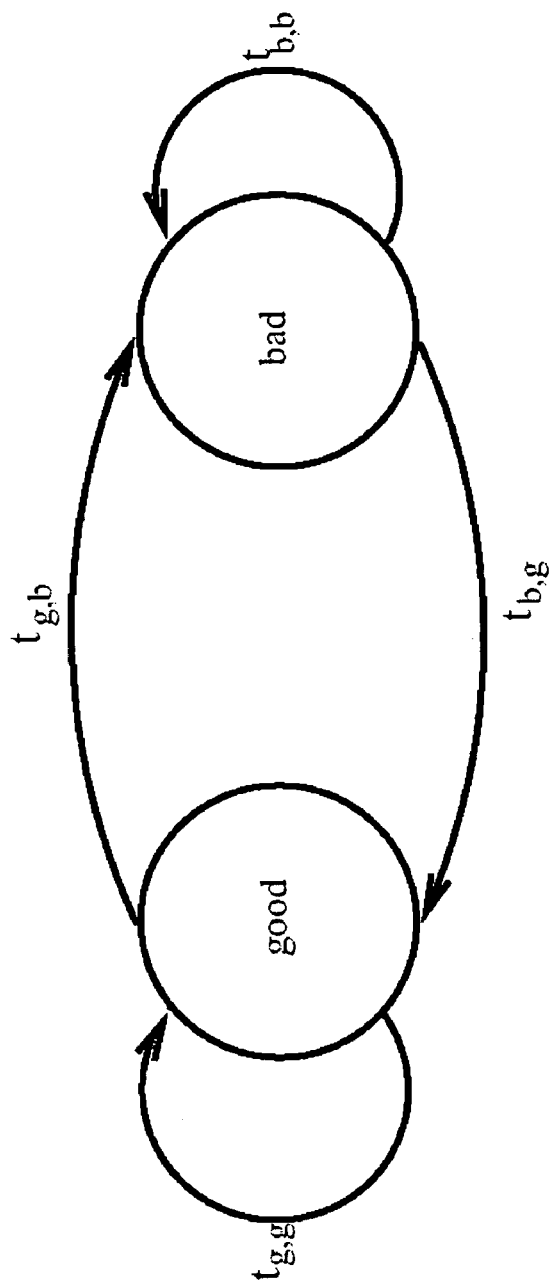
FIG. 10 shows the two-state Markov chain model for wireless channel variations.

To demonstrate the merits of the ERP policy, simulations are performed for two separate sets of cases: a simplified one with no IR and the other with approximate IR. The EGPRS Radio Link Control and block transmission mechanisms are executed in the simulations. $W_{max}$ is taken to be 48. The TCP Timeout period To is initialized to 3s and is updated based on RTT observations, as described in Paxson et. al., "Computing TCP's Retransmission Timer," RFC 2988, 2000. For Dynamic Programming based optimization, To in equation (6) is set to the average timeout value. The round trip delay, designated as $D_{int}$, includes the delay experienced by a segment in the Internet and also the wired part of GPRS network, but excludes the wireless link transmission time. Delay due to transmission on the wireless link is variable and depends on the transmission modes selected for the blocks containing TCP segment data. Throughput is evaluated as the fraction of the number of segments transmitted during the simulation run and the duration of the run. Several runs are performed to obtain an average throughput value. $W_{erp}$ is approximated as the ratio of running average RTT of the TCP segments and the segment transmission time. The segment transmission time is estimated as the average over and mode-m of the product nBlocks(m)Tblock($\gamma$,m), where Tblock($\gamma$,m) is given by (23). The wireless channel variations as a Markov Chain with its two states good and bad represented by C/Ic uniformly distributed in the intervals [0, 15] dB and (16, 30] dB respectively. The time spent in these states is exponentially distributed with respective rates $r_g$ and $r_b$. The discrete time representation of the channel is shown in FIG. 10, with the transition probabilities $t_{g,b}$ and $t_{b,g}$ related to the transition rates as $r_g/r_b+r_g$ and $r_b/r_b+r_g$ respectively.

The cost ratio in β in equation (18) is found to give optimal or close to optimal throughput for a value of 0.1 when time is in units of seconds. The parameter λ in equations (4) and (6) is varied to find optimal TCP throughput.

Based on the discussed models and methodology, a bulk transfer of TCP segments is simulated to assess TCP throughput with adaptive link-layer mechanisms. A bulk transfer originates from a source that has data to send at all times. The TCP throughput is evaluated as the fraction of the number of segments transmitted during a simulation run and the duration of the run. Several runs are performed to obtain an average throughput value.

Figure 11A:
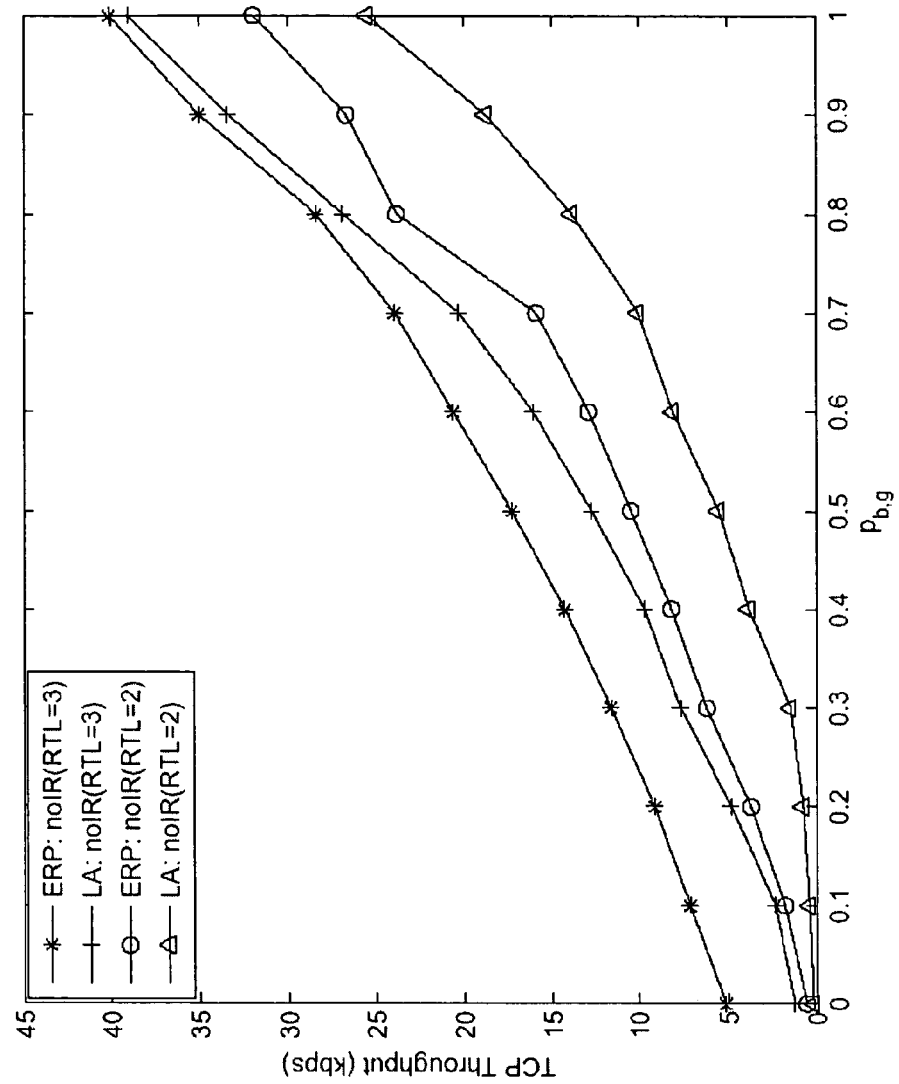
FIG. 11A shows TCP throughput over EGPRS without incremental redundancy, no congestion loss and wired Internet delay of 500 ms. (noIR, $P_{int}$=0%, $D_{int}$=500 ms)
Figure 11B:
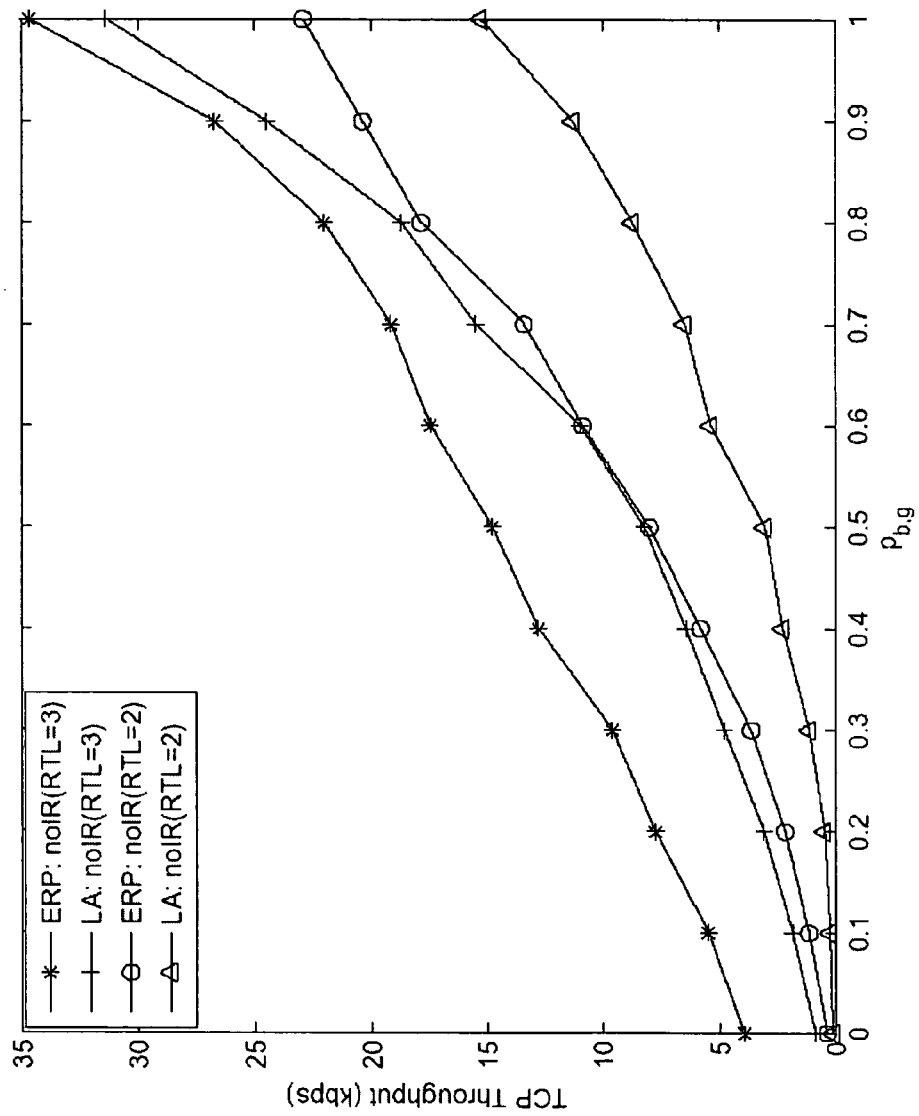
FIG. 11B shows TCP throughput over EGPRS without incremental redundancy, no congestion loss and wired Internet delay of 1000 ms. (noIR, $p_{int}$=0%, $D_{int}$=1000 ms)
Figure 11C:
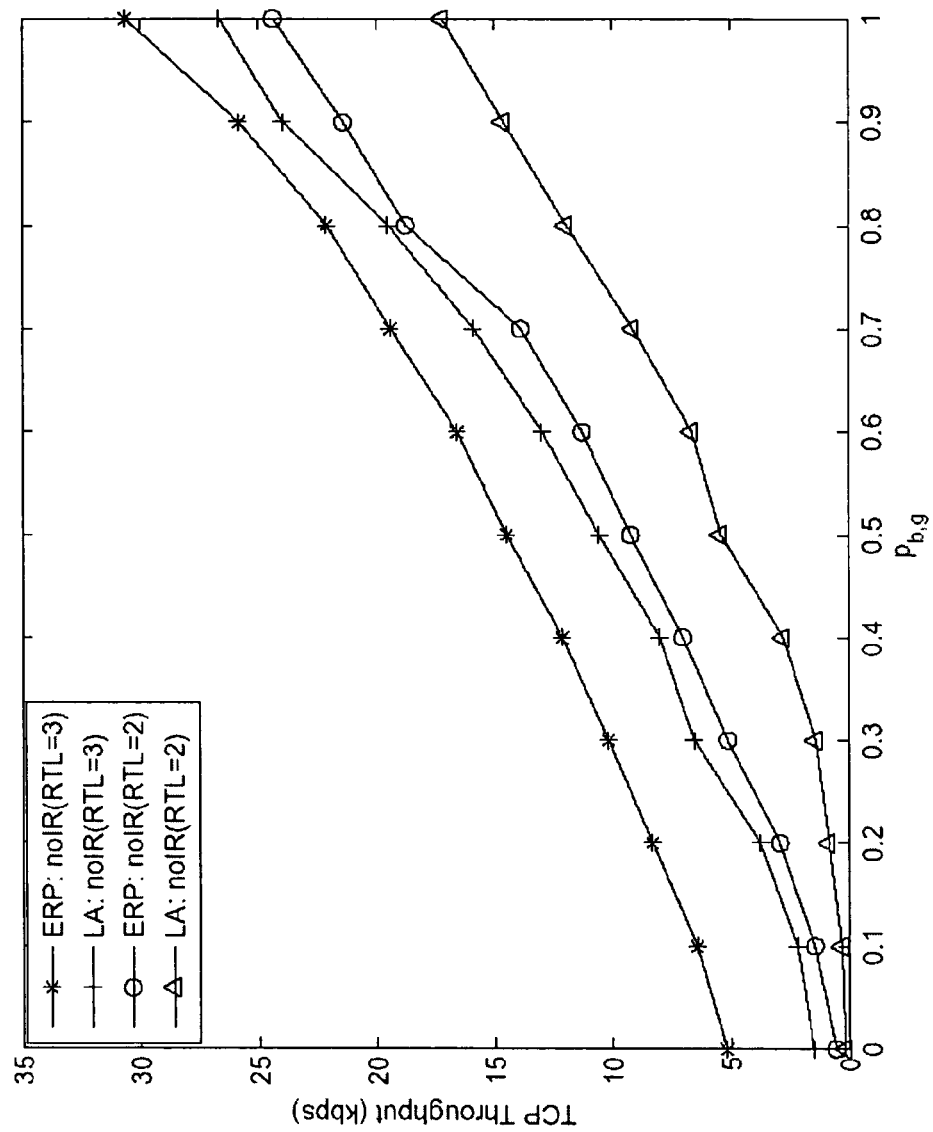
FIG. 11C shows TCP throughput over EGPRS without incremental redundancy, wired Internet loss of 5% and wired Internet delay of 500 ms. (noIR, $p_{int}$=5%, $D_{int}$=500 ms)
Figure 11D:
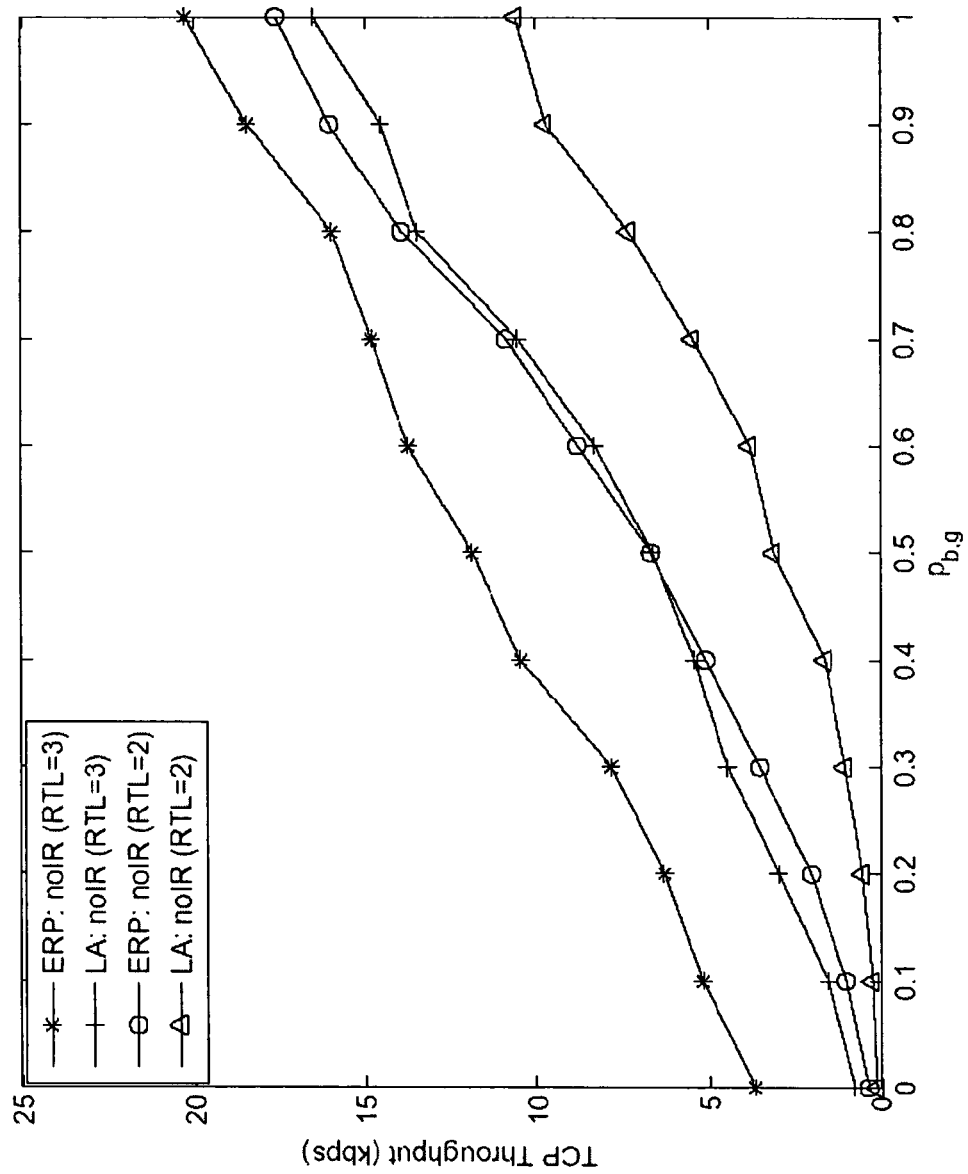
FIG. 11D shows TCP throughput over EGPRS without incremental redundancy, wired Internet loss of 5% and wired Internet delay of 1000 ms. (noIR, $p_{int}$=5%, $D_{int}$=1000 ms)

For the evaluation case with no IR, the BLER does not depend on the transmission attempt number since there is no combining. The BLER subscripts in equations (16), (21) and (23) designating the transmission number can hence be dropped. BLER(γ,m) can be evaluated using FIG. 9 and relation (8). FIGS. 11A and 11B plots TCP throughput versus the transition probability $p_{b,g}$ for RTL=2 and 3, and no Internet congestion losses. $D_{Int}$ for FIG. 11A is 500 ms and 1000 ms for FIG. 11B. The corresponding plots for an Internet congestion loss of $p_{int}$=5% are presented in FIGS. 11C and 11D. In all cases, DP based link adaptation can be seen to yield substantial performance enhancement over link adaptation (LA) which selects transmission mode based on the maximum throughput (as may be ascertained from FIG. 9) for a given C/Ic. For low values of $p_{b,g}$ (representing the case when the channel tends to stay in the bad state) TCP dynamics based optimization measures can be seen to result in a several fold throughput increase. Noticeable improvement in throughput can be observed for good channel conditions as well.

Figure 12A:
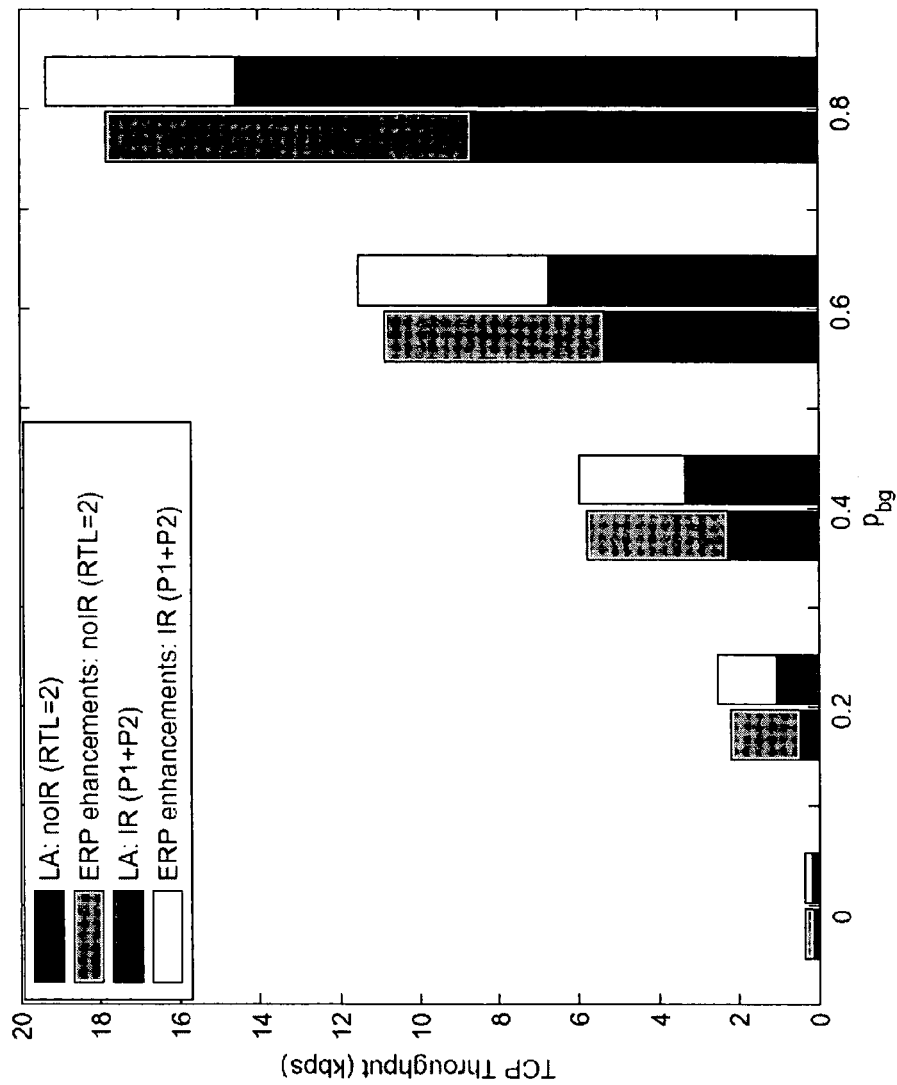
FIG. 12A shows TCP throughput over EGPRS with incremental redundancy, retransmission limit of 2, no wired Internet loss and wired Internet delay of 1000 ms. (IR, RTL=2, $p_{int}$=0%, $D_{int}$=1000 ms)
Figure 12B:
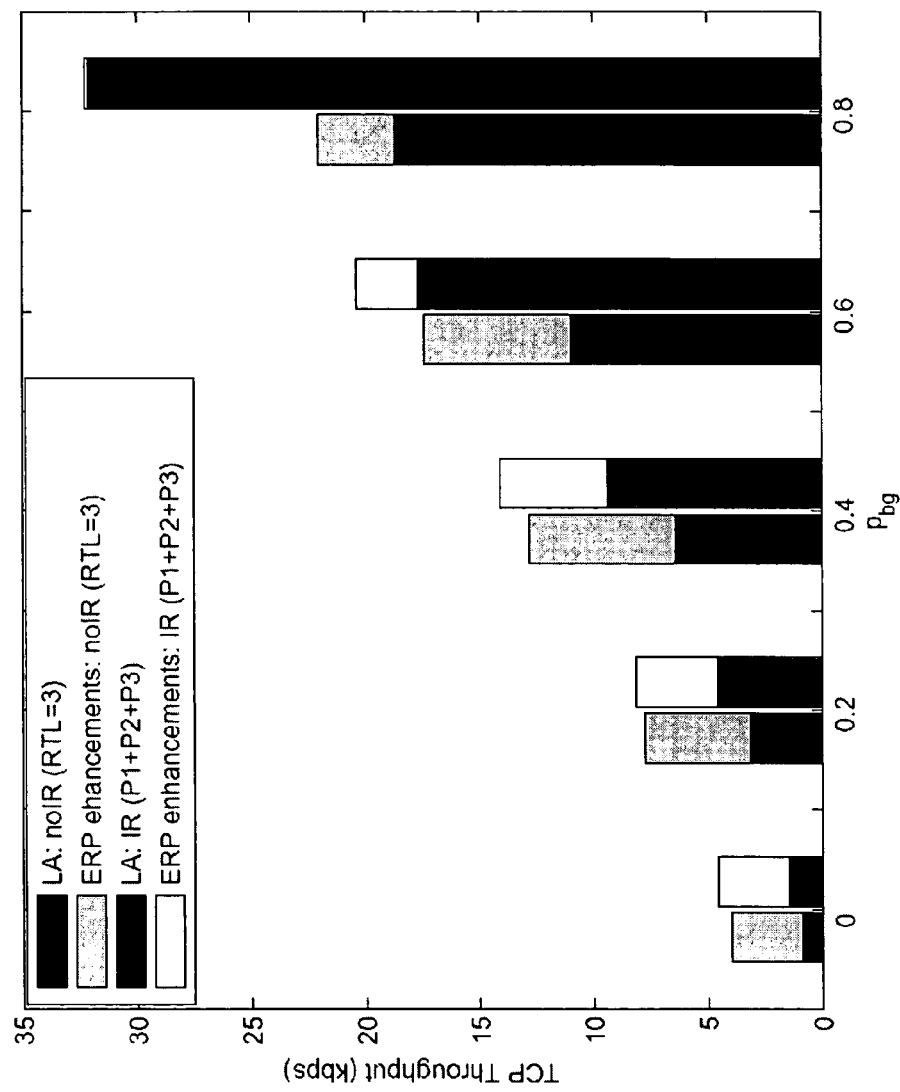
FIG. 12B shows TCP throughput over EGPRS with incremental redundancy, retransmission limit of 3, no wired Internet loss and wired Internet delay of 1000 ms. (IR, RTL=3, $p_{int}$=0%, $D_{int}$=1000 ms)
Figure 12C:
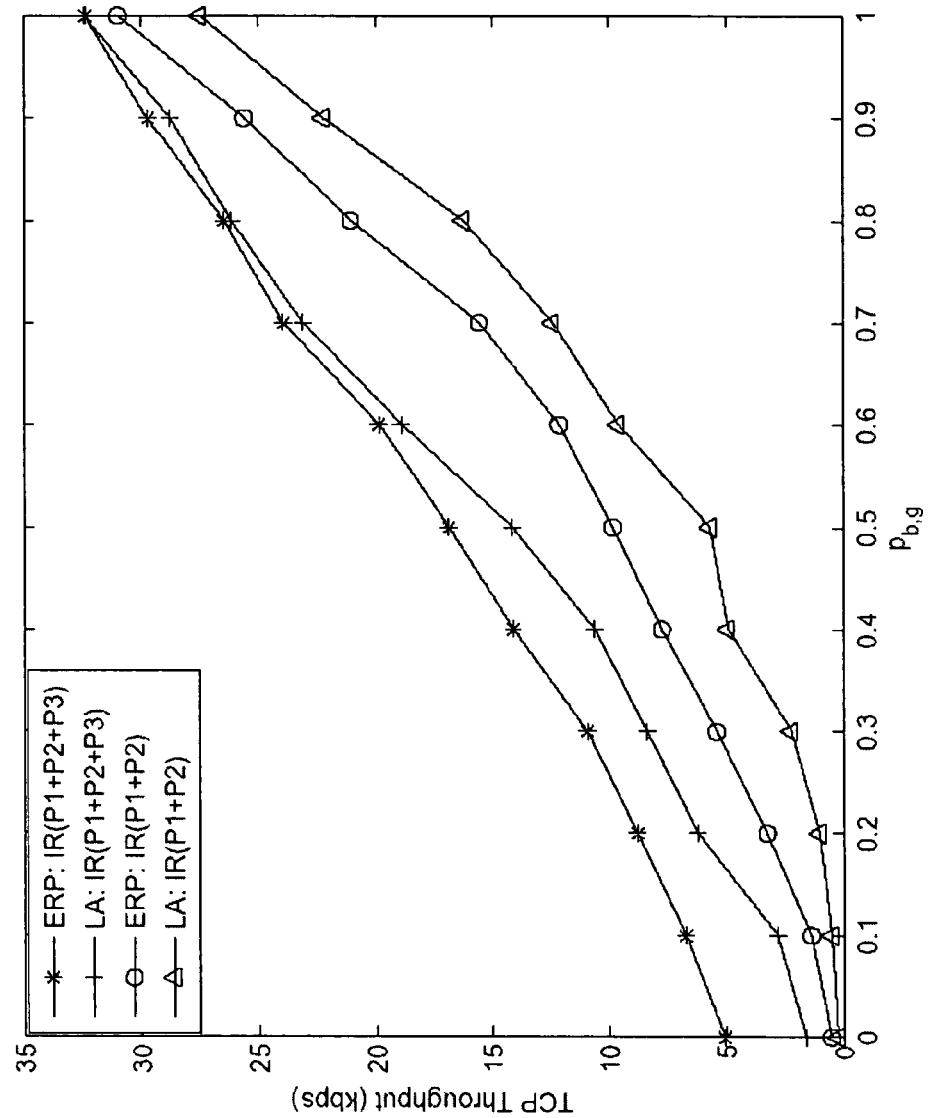
FIG. 12C shows TCP throughput over EGPRS with incremental redundancy, wired Internet loss of 5%, and wired Internet delay of 1000 ms. (IR, $p_{int}$=5%, $D_{int}$=500 ms)
Figure 12D:
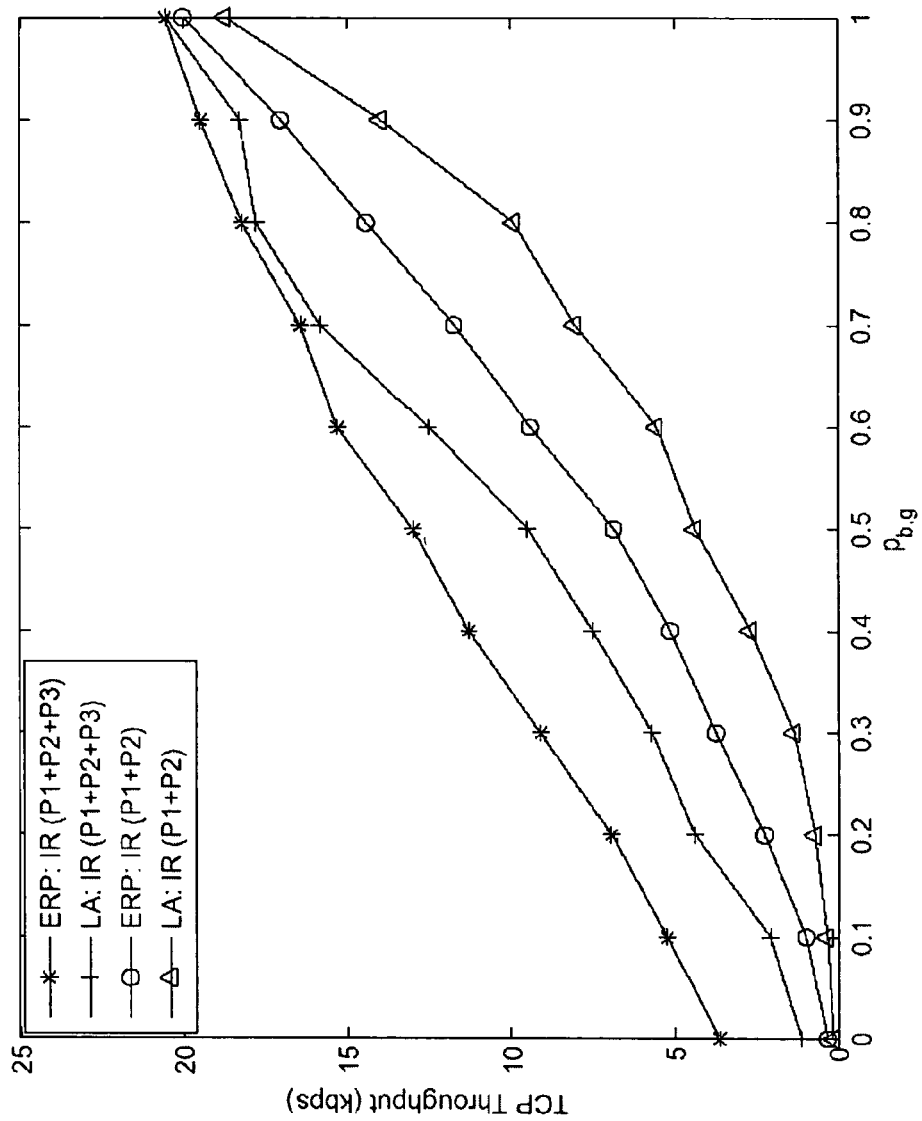
FIG. 12D shows TCP throughput over EGPRS with incremental redundancy, wired Internet loss of 5% and wired Internet delay of 1000 ms. (IR, $p_{int}$=5%, $D_{int}$=1000 ms)

ERP merits are also presented for the scenario with IR. TCP throughput versus the transition probability $p_{b,g}$ for no congestion loss and $D_{int}$=1000 ms, is presented for RTL=2 with IR (represented by IR(P1+P2)) and for RTL=2 with no recombination, in FIG. 12A. The corresponding results for RTL=3 with IR (represented by IR (P1+P2+P3)), and for RTL=3 with no recombination are shown in FIG. 12B. For the modes that offer only two puncturing schemes, P1 puncturing issued for the third transmission attempt. FIGS. 12C and 12D plot TCP throughput for approximate P1+P2 and P1+P2+P3 (denoting combination of blocks transmitted via puncturing schemes 1, 2 and 3) combining, and Internet congestion loss of 5%, and respectively have $D_{Int}$ as 500 ms and 1000 ms. As in the no-IR case, DP based link adaptation can be seen to yield significant throughput enhancement for unfavorable channel conditions, and in general up to 50-100% performance enhancement over LA, which selects the transmission mode based on the maximum throughput (FIG. 9) for a given C/Ic.

Figure 13:
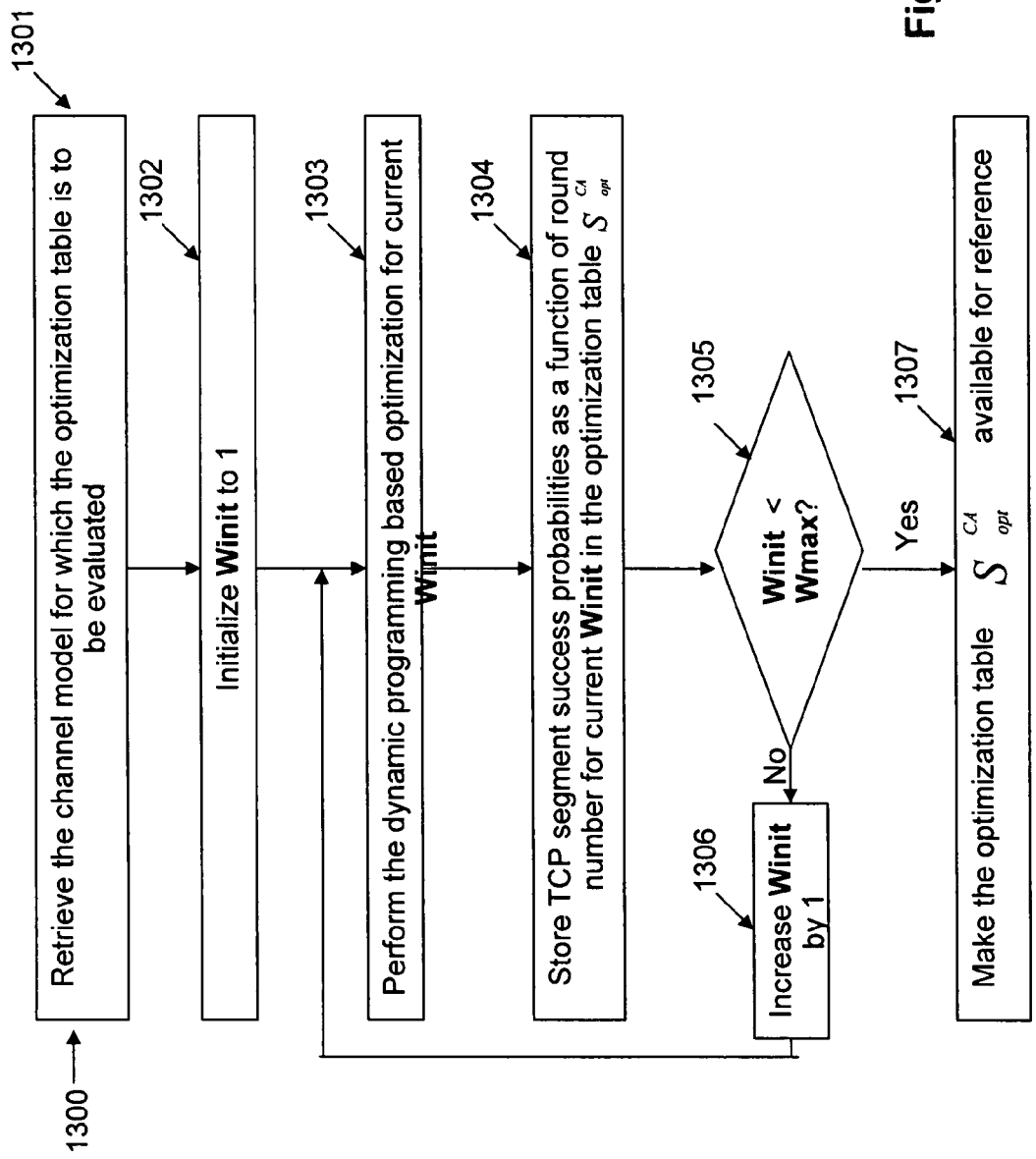
FIG. 13 shows an exemplary method to generate, for a given channel model, the reference optimization table for CAbegin cycles.

FIG. 13 shows an exemplary method 1300 for generation of the optimization table $S_{opt}^{CA}$ for the CAbegin cycles and for a given channel model. In step S1301, the channel model matching the prevailing channel conditions is identified. For instance, an N-state Markovian model can be employed with each state representing the SNR of the channel, and the interstate transition probabilities of the model can be updated based on the observed channel conditions. In step S1302, the initial window size is initialized to 1. The dynamic programming based optimization is then performed for the CAbegin cycle in step S1303. In step S1304, the target segment success probabilities for different channel conditions as ascertained in step S1303, are stored in the optimization table $S_{opt}^{CA}$. The procedure is then repeated for different values of the initial window size until it is determined in step 1305 that the initial window size has reached the maximum window size. In step S1307 the optimization table is made available for reference for performing runtime lookup for TCP segment success probability.

Figure 14:
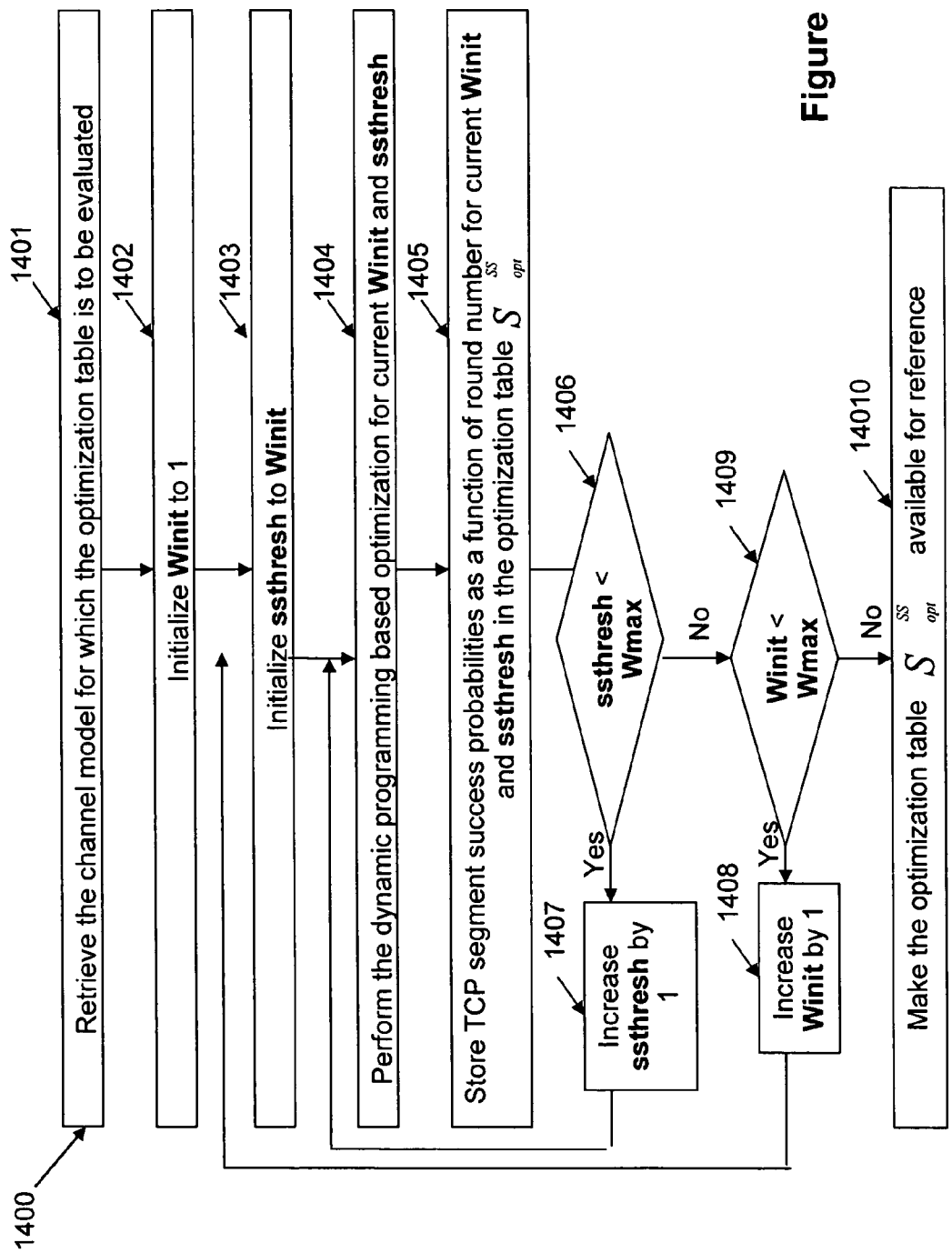
FIG. 14 shows an exemplary method to generate, for a given channel model, the reference optimization table for SSbegin cycles.

An exemplary method 1400 for generating the optimization table $S_{opt}^{SS}$ for the SSbegin cycles and for a given channel model is shown is FIG. 14. In step S1401, the channel model matching the prevailing channel conditions is identified. The initial window size is initialized to 1 in step S1402 and the slow start threshold value is initialized to the initial window size in step S1403. The dynamic programming based optimization is then performed for the CAbegin cycle in step S1404. In step S1405, the target segment success probabilities for different channel conditions as ascertained in step S1404, are stored in the optimization table $S_{opt}^{SS}$. The procedure is then repeated for different values of the slow start threshold and initial window size, each being bounded by the maximum window size. In step S13010 the optimization table is made available for reference for performing runtime lookup for TCP segment success probability.

Figure 15:
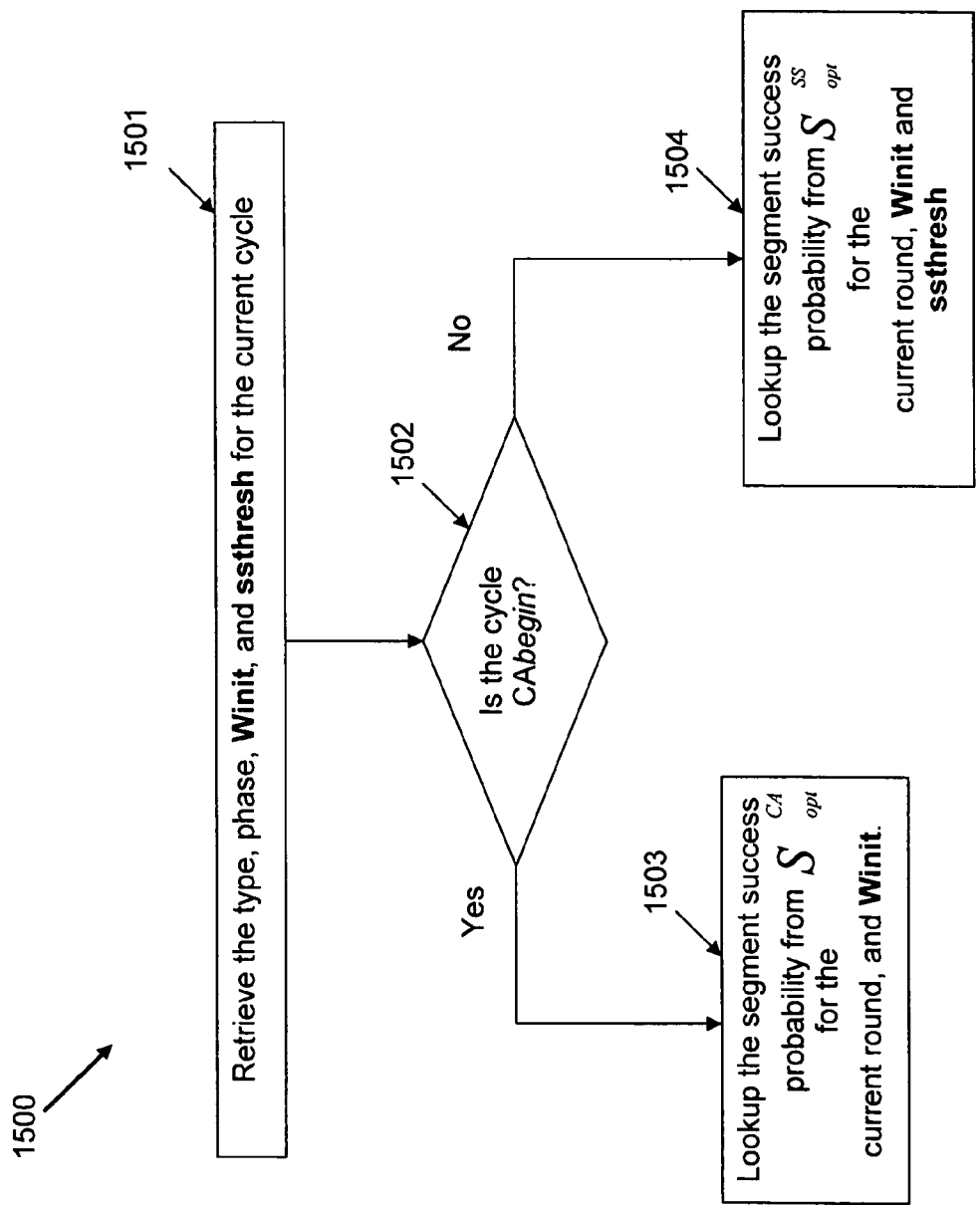
FIG. 15 shows an exemplary method to select the target segment success probability for a TCP segment.

FIG. 15 shows an exemplary method 1500 to determine the target segment success probability for a TCP segment. In step S1501 the type (SSbegin or CAbegin), the phase (slow start, congestion avoidance, or timeout), the initial window size, and the slow start threshold for the current cycle is retrieved. If it is determined in step S1502 that the cycle is a CAbegin one then the segment success probability is retrieved from the optimization table $S_{opt}^{CA}$, otherwise the segment success probability is retrieved from $S_{opt}^{SS}$.

Figure 16:
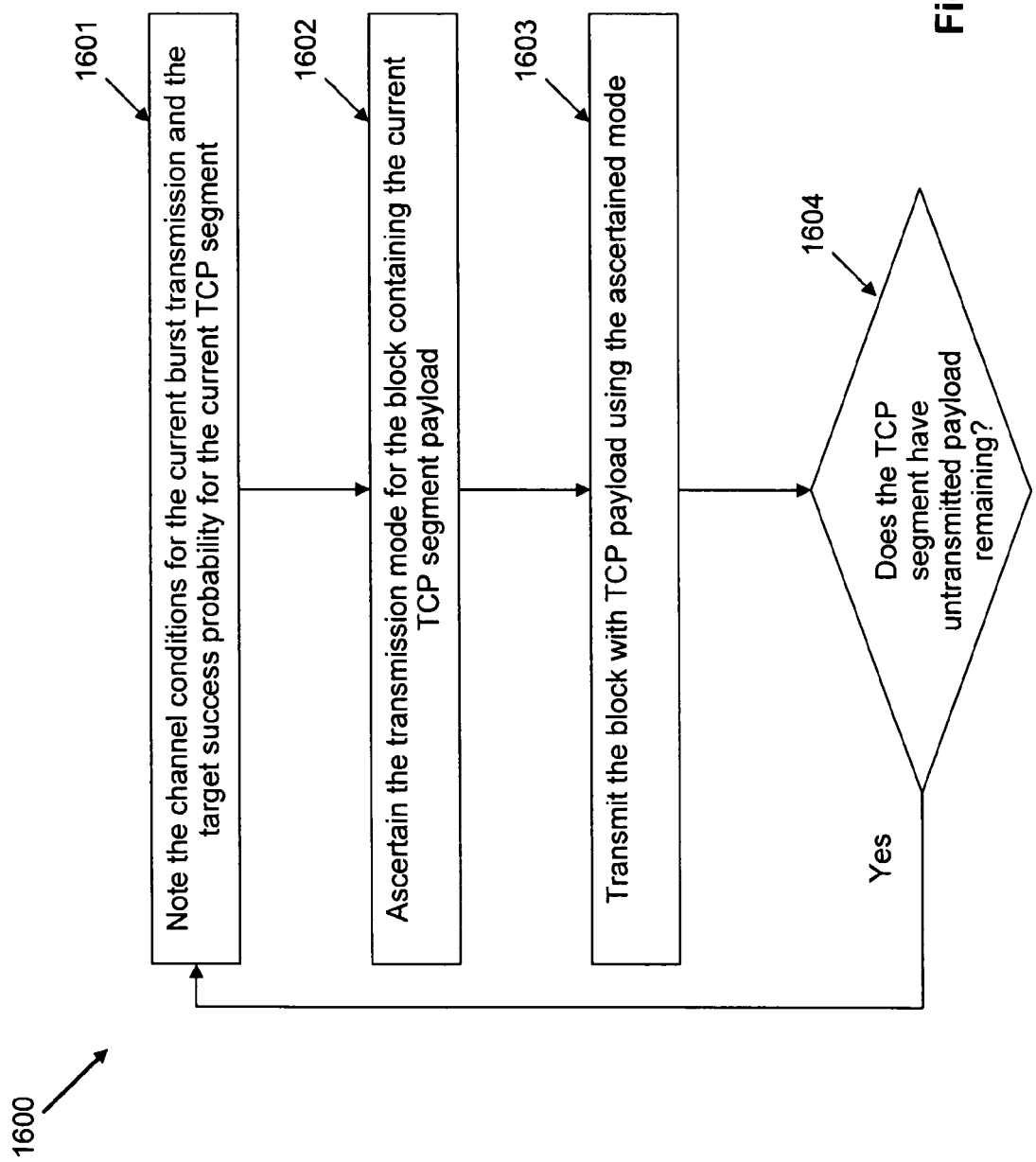
FIG. 16 shows an exemplary method for EGPRS mode selection.

FIG. 16 shows an exemplary method 1600 to transmit a TCP segment via EGPRS blocks. The channel condition for the present burst transmission is retrieved in step S1601. The TCP segment success probability as evaluated via method 1500 is also noted. The transmission mode for the EGPRS block to carry the TCP payload is then determined in step S1602 via the relation (18). The block is transmitted in step S1603, and if is determined in step S1604 that untransmitted payload for the current segment remains, the method 1600 is repeated.

Figure 17:
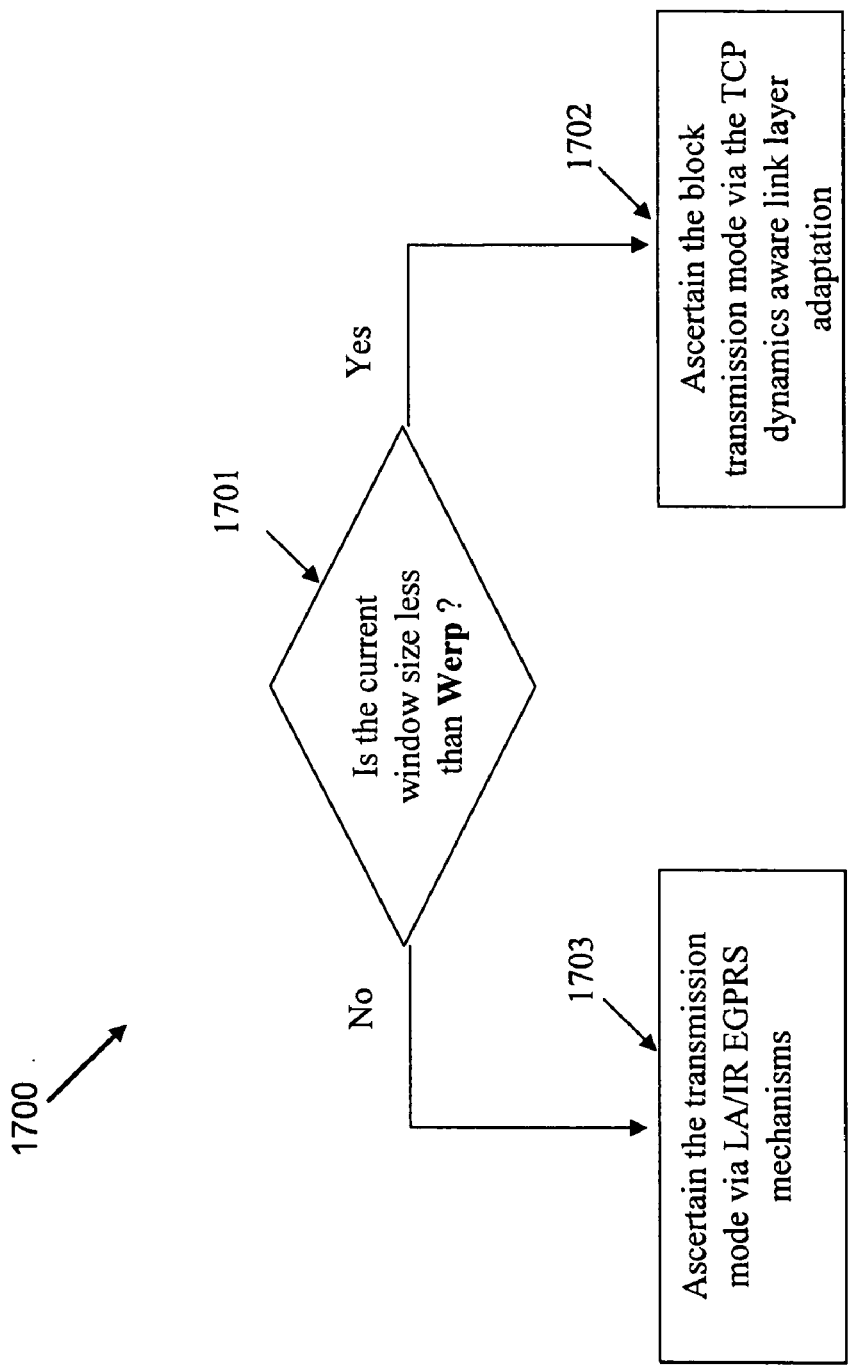
FIG. 17 shows an exemplary method for the Early Round Protection (ERP) scheme for EGPRS networks.

An exemplary method for executing the Early Round Protection scheme is shown in FIG. 17. Is it is determined in step S1701 that the current congestion window size is less than Werp, then TCP dynamics aware link-adaptation is performed in step 1702 via method 1600. On the other hand, if the window size is greater than Werp, the EGPRS LA/IR mechanism is employed in step 1703 for block transmission.

Figure 18:
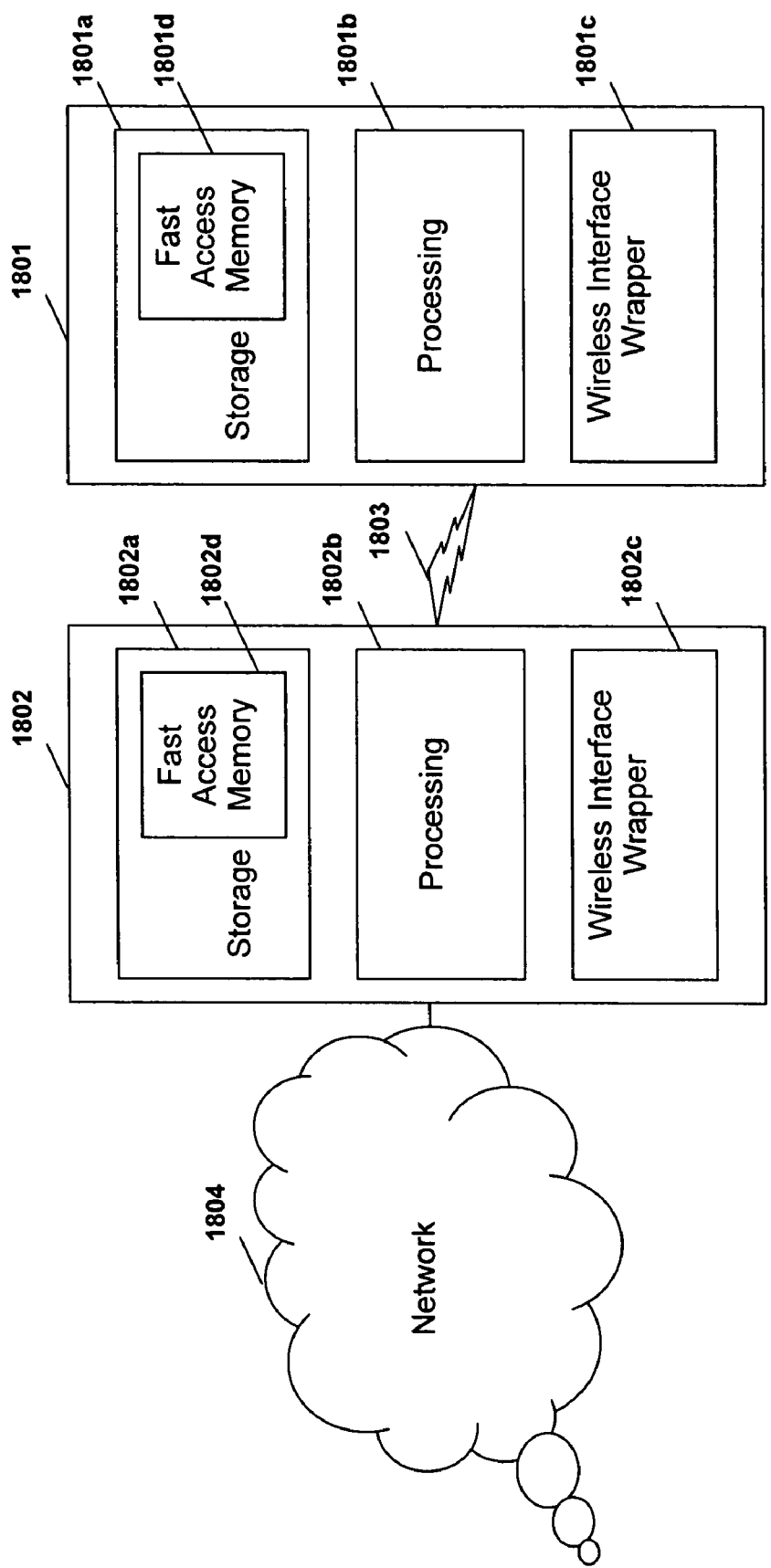
FIG. 18 shows an exemplary communications system for performing TCP dynamics aware link-adaptation for TCP throughput optimization.

FIG. 18 shows an exemplary communications system 1800 for the methods 1300, 1400, 1500, 1600, and 1700 to perform TCP dynamics aware link-layer adaptation in a wireless network. The system 1800 comprises a mobile device 1801 as an example of the mobile devices 101a and 101b in FIG. 1. The mobile device 1801 comprises a storage 1801a, a processing unit 1801b, and a wireless interface wrapper 1801c. The storage 1801a comprises a fast access memory 1801d. The storage 1801a stores data and instructions for performing TCP dynamics aware link-layer adaptation. The optimization tables for different channel models are stored in the fast access memory 1801d. The processing unit 1801b executes instructions for performing TCP dynamics aware link-layer adaptation procedures for different channel models. The wireless interface wrapper 1802c retrieves channel state information for a wireless link. The exemplary system 1800 also comprises a further exemplary end device 1802 as an embodiment of the base station 103a, or access point 103b in FIG. 1. The base station or access point 1802 comprises exemplary components which are operationally identical to the ones constituting the mobile station 1801. The base station or access point 1802 is connected to a wired network 1804 which encompasses the Internet and the wireline part of a wireless network, generally depicted by a wireless channel 1803 connecting the base station 1802 with the mobile device 1801. An IP server, for example the Internet host 102 in FIG. 1, constitutes one end of a TCP flow and is connected to the Internet. With the cross-layer approach and the optimization framework implemented in a TCP source, for example in the mobile device 1801 the transfer rate of TCP segments transmitted by the mobile device 1801 to the base station or access point 1802 can be optimized.

What is claimed is:

1. A method for optimizing the throughput of a flow of TCP segments being transferred from a TCP source to a TCP destination over a transmission path, with the transmission path of the flow encompassing a wireless link between a wireless transmitter and a wireless receiver, said method comprising the steps of:
   a. providing for a plurality of congestion window size variation patterns based on TCP congestion control algorithms used by the TCP source, each pattern comprising a number of rounds;
   b. determining a plurality of wireless channel conditions;
   c. defining a plurality of initial window sizes;
   d. calculating, with respect to each of the wireless channel conditions and each of the initial window sizes, for each round of each congestion window size variation pattern a target success probability for each TCP segment to be transmitted during the respective round;
   e. selecting a calculated target success probability for a TCP segment to be transmitted by a TCP transmitter by determining a current congestion window size variation pattern, a current round number and a current initial window size for the variation pattern;
   f. selecting, at the data link-layer of the wireless transmitter and in response to the selected target success probability, at least one adaptive data link-layer transmission mode for transmitting the TCP segment in at least one link-layer block from the wireless transmitter to the wireless receiver to achieve an optimized TCP throughput; and
   g. repeating steps e) and f) for the next TCP segment to be transmitted.

2. The method of claim 1, wherein the TCP congestion control algorithms are the slow start and the congestion avoidance algorithm, wherein in step c) at least one slow start threshold value is defined, which is used in steps d) and e) when the congestion window size variation pattern begins in the slow start phase.

3. The method of claim 1, wherein the adaptive data link-layer transmission mode comprises an adaptive modulation and an adaptive coding schema.

4. The method of claim 1, wherein the step d) of calculating the target TCP segment success probabilities is based on finite-period dynamic programming methods, wherein the calculated target TCP segment success probabilities are obtained by minimizing the cost-to-go.

5. The method of claim 1, wherein the TCP source and the wireless transmitter is a mobile device and the wireless receiver is a base station or an access point.

6. The method of claim 1, wherein the TCP destination is a mobile device and the wireless transmitter is a base station or an access point.

7. The method of claim 1, wherein step b) of determining a plurality of wireless channel conditions comprises the step of evaluating wireless channel conditions on the basis of different channel models, and wherein the target success probabilities, the type of the congestion window size variation patterns, the round number of each congestion window size variation pattern, the initial window sizes and the slow start threshold values are stored.

8. The method of claim 1, wherein step c) of defining a plurality of initial window sizes comprises the step of accounting for all initial window size values from 1 to the maximum congestion window size of a TCP connection.

9. The method of claim 1, wherein step b) of determining a plurality of wireless channel conditions comprises the step of evaluating the wireless channel conditions on the basis of observed wireless channel conditions at runtime.

10. The method of claim 1, wherein calculating of the target success probabilities according to step d) is a function of the TCP congestion states, which are given by the timeout loss indication and the triple duplicate loss indication.

11. The method of claim 1, wherein step f) of selecting at least one adaptive data link-layer transmission mode is a function of the link-layer block error rate characteristics.

12. The method of claim 1, wherein the wireless link of a wireless network is a GPRS or a EGPRS network.

13. The method of claim 1, wherein step f) comprises the steps: determining, whether a current window size is less than a predetermined window size value; if not, transmitting the TCP segment via at least one link-layer block by using the link quality control procedure of EGPRS.

14. The method of claim 13, wherein the link quality control procedure comprises link adaptation (LA) and the incremental redundancy (IR).

15. A communications system for optimizing the throughput of a TCP flow in a wireless network, comprising a wireless network with at least one base station and/or at least one access point, a plurality of end devices connected to the wireless network, each end device at least having a transport layer supporting TCP, wherein each end device and each base station or access point comprises:
   a storage for storing a plurality of target TCP segment success probabilities, the type of TCP congestion window size variation patterns, the round number of each congestion window size variation pattern, at least one initial window size;
   means for determining a current congestion window size variation pattern, a current round number and a current initial window size used by the respective end device to transmit a TCP segment;
   a processor for selecting a stored target success probability for a TCP segment to be transmitted in response to the current congestion window size variation pattern, the current round number and the current initial window size determined, and for selecting in response to the selected target success probability at least one adaptive data link-layer transmission mode; and
   means for transmitting the TCP segment in at least one link-layer block by using the selected adaptive link-layer transmission mode.

16. The communications system of claim 15, wherein each of the end devices includes an interface for retrieving wireless channel state information.

\* \* \* \* \*